United States Patent
Kukal et al.

(10) Patent No.: US 9,934,354 B1
(45) Date of Patent: Apr. 3, 2018

(54) METHODS, SYSTEMS, AND COMPUTER PROGRAM PRODUCT FOR IMPLEMENTING A LAYOUT-DRIVEN, MULTI-FABRIC SCHEMATIC DESIGN

(71) Applicant: Cadence Design Systems, Inc., San Jose, CA (US)

(72) Inventors: Taranjit Singh Kukal, Nirankari Colony (IN); Balvinder Singh, Faridabad (IN); Steven R. Durrill, Campbell, CA (US); Arnold Ginetti, Antibes (FR); Vikrant Khanna, Noida (IN); Abhishek Dabral, Noida (IN); Madhur Sharma, Ghaziabad (IN); Nikhil Gupta, Vasant Kunj (IN); Ritabrata Bhattacharya, Malviya Nagar (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 15/205,593

(22) Filed: Jul. 8, 2016

Related U.S. Application Data

(60) Provisional application No. 62/357,310, filed on Jun. 30, 2016.

(51) Int. Cl.
*G06F 17/50* (2006.01)

(52) U.S. Cl.
CPC ...... *G06F 17/5081* (2013.01); *G06F 17/5009* (2013.01); *G06F 17/5077* (2013.01); *G06F 2217/40* (2013.01); *G06F 2217/74* (2013.01)

(58) Field of Classification Search
CPC ............. G06F 17/5022; G06F 2217/04; G06F 2217/08; G06F 2217/38; G06F 2217/40; G06F 2217/74

USPC ......................................... 716/110, 111, 112
See application file for complete search history.

(56) References Cited

U.S. PATENT DOCUMENTS

| | | |
|---|---|---|
| 4,457,027 A | 7/1984 | Gladstone |
| 5,396,435 A | 3/1995 | Ginetti |
| 5,426,591 A | 6/1995 | Ginetti et al. |
| 5,633,803 A | 5/1997 | Silve et al. |
| 5,638,290 A | 6/1997 | Ginetti et al. |
| 5,726,902 A | 3/1998 | Mahmood et al. |
| 5,751,596 A | 5/1998 | Ginetti et al. |
| 5,764,525 A | 6/1998 | Mahmood et al. |
| 5,825,658 A | 10/1998 | Ginetti et al. |

(Continued)

OTHER PUBLICATIONS

Hon-Chi Ng, "Cpr E 305 Laboratory Tutorial ¾ Verilog Syntax: Summary of Verilog Syntax" Last Updated: Feb. 7, 2001.

(Continued)

*Primary Examiner* — Sun Lin
(74) *Attorney, Agent, or Firm* — Vista IP Law Group, LLP

(57) ABSTRACT

Disclosed are techniques for implementing a layout-driven, multi-fabric schematic design of an electronic design. These techniques identify a multi-fabric layout spanning across multiple design fabrics and layout connectivity information and determine a device map that correlates a first set of devices in the multi-fabric layout with respective parasitic models. The device map can be identified one or more pre-existing device maps or can be constructed anew. A multi-fabric schematic can be generated by using at least the respective parasitic models and the layout connectivity information.

20 Claims, 27 Drawing Sheets

(56) References Cited

U.S. PATENT DOCUMENTS

| | | | |
|---|---|---|---|
| 5,841,663 A | 11/1998 | Sharma et al. |
| 5,896,299 A | 4/1999 | Ginetti et al. |
| 5,956,257 A | 9/1999 | Ginetti et al. |
| 6,086,621 A | 7/2000 | Ginetti et al. |
| 6,113,647 A | 9/2000 | Silve et al. |
| 6,145,117 A | 11/2000 | Eng |
| 6,170,080 B1 | 1/2001 | Ginetti et al. |
| 6,353,612 B1 | 3/2002 | Zhu |
| 6,378,116 B1 | 4/2002 | Ginetti |
| 6,401,128 B1 | 6/2002 | Stai |
| 6,405,345 B1 | 6/2002 | Ginetti |
| 6,519,743 B1 | 2/2003 | Nauts et al. |
| 6,622,290 B1 | 9/2003 | Ginetti et al. |
| 6,622,291 B1 | 9/2003 | Ginetti |
| 7,143,341 B1 | 11/2006 | Kohli |
| 7,168,041 B1 | 1/2007 | Durrill et al. |
| 7,257,799 B2 | 8/2007 | McKenney |
| 7,350,164 B2 | 3/2008 | Xu |
| 7,468,982 B2 | 12/2008 | Mehra |
| 7,490,309 B1 | 2/2009 | Gonzalesz et al. |
| 7,555,739 B1 | 6/2009 | Ginetti et al. |
| 7,634,743 B1 | 12/2009 | Ginetti |
| 7,711,767 B2 | 5/2010 | Agrawal |
| 7,779,286 B1 | 8/2010 | Pritchard |
| 7,802,221 B1 | 9/2010 | Brink |
| 7,949,987 B1 | 5/2011 | Ginetti et al. |
| 7,971,175 B2 | 6/2011 | Ginetti |
| 7,971,178 B1 | 6/2011 | Marwah et al. |
| 7,990,375 B2 | 8/2011 | Kohli et al. |
| 8,046,730 B1 | 10/2011 | Ferguson et al. |
| 8,136,071 B2 | 3/2012 | Solomon |
| 8,145,458 B1 | 3/2012 | Kukal et al. |
| 8,191,035 B1 | 5/2012 | Van Brink |
| 8,255,845 B2 | 8/2012 | Ginetti |
| 8,261,228 B1 | 9/2012 | Gopalakrishnan et al. |
| 8,271,933 B1 | 9/2012 | Kohli et al. |
| 8,281,272 B1 | 10/2012 | Ginetti |
| 8,286,025 B1 | 10/2012 | Pritchard |
| 8,286,110 B1 | 10/2012 | Kukal et al. |
| 8,316,337 B2 | 11/2012 | Bhattacharya et al. |
| 8,316,342 B1 | 11/2012 | Kukal et al. |
| 8,347,261 B2 | 1/2013 | Ginetti et al. |
| 8,364,656 B2 | 1/2013 | Arora et al. |
| 8,438,524 B1 | 5/2013 | Kohli et al. |
| 8,452,582 B1 | 5/2013 | Al-hawari et al. |
| 8,453,136 B1 | 5/2013 | Hahn et al. |
| 8,479,134 B2 | 7/2013 | Bhattacharya et al. |
| 8,521,483 B1 | 8/2013 | Kukal et al. |
| 8,527,929 B2 | 9/2013 | Bhattacharya et al. |
| 8,527,934 B2 | 9/2013 | Ginetti et al. |
| 8,566,767 B1 | 10/2013 | Kukal et al. |
| 8,594,988 B1 | 11/2013 | Spyrou et al. |
| 8,595,671 B2 | 11/2013 | He |
| 8,631,181 B2 | 1/2014 | Feehrer |
| 8,645,894 B1 | 2/2014 | Kukal et al. |
| 8,656,329 B1 | 2/2014 | Kukal et al. |
| 8,719,754 B1 | 5/2014 | Ginetti |
| 8,732,636 B2 | 5/2014 | Ginetti et al. |
| 8,732,651 B1 | 5/2014 | Kukal et al. |
| 8,762,906 B2 | 6/2014 | Ginetti et al. |
| 8,769,455 B1 | 7/2014 | Singh et al. |
| 8,806,405 B2 | 8/2014 | Colwell |
| 8,898,039 B1 | 11/2014 | Kukal et al. |
| 8,910,100 B1 | 12/2014 | Wilson et al. |
| 8,930,878 B1 | 1/2015 | Leef |
| 9,165,931 B1 | 10/2015 | Schmit |
| 9,223,915 B1* | 12/2015 | Ginetti et al. ...... G06F 17/5022 |
| 9,348,960 B1* | 5/2016 | Ginetti et al. ...... G06F 17/5022 |
| 9,361,415 B1* | 6/2016 | Ginetti et al. ...... G06F 17/5022 |
| 9,449,130 B1* | 9/2016 | Kukal et al. ........ G06F 17/5022 |
| 2003/0051222 A1 | 3/2003 | Williams et al. |
| 2003/0196182 A1 | 10/2003 | Hahn |
| 2004/0034842 A1 | 2/2004 | Mantey |
| 2004/0156322 A1 | 8/2004 | Mehra |
| 2005/0273732 A1 | 12/2005 | Xu |
| 2006/0111884 A1 | 5/2006 | McGaughy et al. |
| 2006/0288323 A1 | 12/2006 | Birch |
| 2007/0229537 A1 | 10/2007 | Kohli et al. |
| 2008/0009412 A1 | 4/2008 | Osann |
| 2008/0301600 A1 | 12/2008 | Kumagai |
| 2009/0007031 A1 | 1/2009 | Ginetti et al. |
| 2010/0031209 A1 | 2/2010 | Luan et al. |
| 2010/0115207 A1 | 5/2010 | Arora et al. |
| 2010/0306729 A1 | 12/2010 | Ginetti |
| 2011/0041106 A1 | 2/2011 | Li et al. |
| 2011/0061034 A1 | 3/2011 | Ginetti et al. |
| 2011/0153288 A1 | 6/2011 | Bhattacharya et al. |
| 2011/0153289 A1 | 6/2011 | Bhattacharya et al. |
| 2011/0154276 A1 | 6/2011 | Bhattacharya et al. |
| 2011/0161899 A1 | 6/2011 | Ginetti et al. |
| 2011/0161900 A1 | 6/2011 | Ginetti et al. |
| 2011/0173582 A1* | 7/2011 | Bhattacharya et al. ................. G06F 17/5081 716/106 |
| 2012/0047434 A1 | 2/2012 | Ginetti |
| 2012/0068229 A1 | 3/2012 | Bemanian |
| 2013/0097572 A1 | 4/2013 | Ginetti et al. |
| 2013/0246900 A1 | 9/2013 | Ginetti et al. |
| 2013/0290834 A1 | 10/2013 | Ginetti et al. |
| 2014/0103959 A1 | 4/2014 | Andreev |
| 2014/0103985 A1 | 4/2014 | Andreev |
| 2014/0123094 A1 | 5/2014 | Colwell et al. |
| 2014/0223402 A1 | 8/2014 | Satou |

OTHER PUBLICATIONS

Stuart Sutherland, "Verilog HDL: Quick Reference Guide" 2001.
"Summary of Verilog Syntax" URL: http://www.verilogtutorial.info/chapter_3.htm, 2007, Accessed on Sep. 2, 2014.
Non-Final Office Action dated Apr. 13, 2015 for U.S. Appl. No. 14/503,408.
Non-Final Office Action dated Apr. 16, 2015 for U.S. Appl. No. 14/503,407.
Notice of Allowance dated Aug. 21, 2015 for U.S. Appl. No. 14/503,406.
Notice of Allowance dated Oct. 28, 2015 for U.S. Appl. No. 14/503,407.
Notice of Allowance dated Oct. 29, 2015 for U.S. Appl. No. 14/503,408.
Ex-parte Quayle Action dated Nov. 2, 2015 for U.S. Appl. No. 14/503,404.
Notice of Allowance dated Jan. 22, 2016 for U.S. Appl. No. 14/503,404.
Ex-parte Quayle Action dated Nov. 27, 2015 for U.S. Appl. No. 14/503,404.
Non-Final Office Action dated Mar. 27, 2017 for U.S. Appl. No. 14/754,535.
Non-Final Office Action dated Apr. 12, 2017 for U.S. Appl. No. 14/871,735.
Kahng et al.;"Improved on-chip router analytical power and area modeling"; Year: 2010; 2010 15th Asia and South Pacific Design Automation Conference (ASP-DAC); pp. 241-246.
"Application Note: Best Practices for S-Parameter Extraction to Improve Time-Domain Convergence with Allegro Sigrity Tools", Cadence Design Systems, Inc., Nov. 2013.
"Guidelines for Robust S-Parameter Model Development Application Note, Product Version 15.2", Cadence Design Systems, Inc., Jun. 2004.
Creech, Joseph. "S-Parameters Allow High-Frequency Verification of RF Switch Models." Analog Dialogue 45.10 (2011): 1-4.
Notice of Allowance dated Sep. 20, 2017 for U.S. Appl. No. 14/871,735.
Notice of Allowance dated Sep. 20, 2017 for U.S. Appl. No. 14/754,535.

* cited by examiner

| REFDES | S-Para. Model | Prop. Name 1 | Prop. Value 1 | Prop. Name 2 | Prop. Value 2 |
|---|---|---|---|---|---|
| C1 | C1.s2p | propName 11 | Value11 | ... | ... |
| C2 | C2.s2p | propName 21 | Value21 | ... | ... |
| C3 | C3.s2p | propName 31 | Value31 | ... | ... |
| C4 | C4.s2p | propName 41 | Value41 | ... | ... |
| C4_1 | C4_1.s2p | propName 51 | Value51 | ... | ... |
| L1 | L1.s2p | propName 61 | Value61 | ... | ... |
| L1_1 | L1_1.s2p | propName 71 | Value71 | ... | ... |
| L2 | L2.s2p | propName 81 | Value81 | ... | ... |
| L3 | L3.s2p | propName 91 | Value91 | ... | ... |
| L4 | L4.s2p | propName 101 | Value101 | ... | ... |
| R3 | R3.s2p | propName 201 | Value201 | ... | ... |
| FLTR | FLTR.s10p | propName 301 | Value301 | ... | ... |
| SWITCH | SWITCH.s34p | propName 401 | Value401 | ... | ... |
| LNA | LNA.s2p | propName 501 | Value501 | ... | ... |

FIG. 4B     400B

METHODS, SYSTEMS, AND COMPUTER PROGRAM PRODUCT FOR IMPLEMENTING A LAYOUT-DRIVEN, MULTI-FABRIC SCHEMATIC DESIGN

CROSS REFERENCE TO RELATED PATENT APPLICATIONS

This application is related to U.S. patent application Ser. No. 14/754,535, filed concurrently and entitled "METHODS, SYSTEMS, AND COMPUTER PROGRAM PRODUCT FOR CONSTRUCTING A SIMULATION SCHEMATIC OF AN ELECTRONIC DESIGN ACROSS MULTIPLE DESIGN FABRICS". The contents of the aforementioned U.S. patent application are hereby incorporated by reference in their respective entireties for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Customers may often desire to simulate an IC (integrated circuit) design within the context of a system design that spans across the IC design fabric, the package design fabric, and PCB (printed circuit board) design fabric. The schematics of PCB and Package may not always exist at the time of simulation. Even if the schematics of PCB and Package do exist at the time of simulation, these schematics may be available in different formats for different schematic tools. As a result, these schematics may be incompatible with each other and thus cannot be simulated together without translation, transformation, compilation, etc. (collectively transformation).

In addition, customers may desire to simulate this system design within the context of parasitics of the chip layout, the package layout, and the PCB layout. The parasitic-models may be extracted as combined geometries across multiple design fabrics. Some examples of such models may include on-chip spiral inductor extracted in conjunction with the package planes and traces. In some cases, complete PCB (or package) may be extracted as a single parasitic model that needs to connect to the remainder of the system. Nonetheless, it is very difficult to include parasitics from different design fabrics (e.g., different design fabrics in various layouts) in the multi-fabric schematic.

Conventional approaches require manual creation of parasitic aware multi-fabric schematics where a new schematic is manually created where PCB and package components are stitched into the IC schematic to create the multi-fabric schematic. On the other hand, if PCB/package schematics available in their native schematic editors, user needs to copy the same schematics in the IC schematic entry tool. In some cases, if PCB/package schematics do not exist, user has to construct new schematic by going through respective layouts to obtain the connectivity.

In addition, parasitics of PCB and package traces and metal passive structures are manually stitched into the multi-fabric schematic. Moreover, if parasitic models are extracted from portion of geometry that crosses multiple design fabrics, a user is required to keep a record of model interfaces to ensure that the model is properly connected and stitched into system schematic that spans across the IC design fabric, the PCB design fabric, and the package design fabric to maintain the entire design in single schematic entry tool for purposes of simulations.

Therefore, there exists a need for a method, system, and computer program product for provisioning measurements for constructing a multi-fabric schematic of an electronic design across multiple design fabrics.

SUMMARY

Disclosed are method(s), system(s), and article(s) of manufacture for implementing a layout-driven, multi-fabric schematic design of an electronic design in various embodiments. Some first embodiments are directed at a method for implementing a layout-driven, multi-fabric schematic design of an electronic design.

In these first embodiments, a multi-fabric layout spanning across multiple design fabrics and layout connectivity information may be identified; and a device map that correlates a first set of devices in the multi-fabric layout with respective parasitic models may be determined. The device map may be identified one or more pre-existing device maps or may be constructed anew. A multi-fabric schematic may be generated by using at least the respective parasitic models and the layout connectivity information. In some of these embodiments, the multi-fabric schematic may be modified based in part or in whole upon results of verifications or analyses performed on the multi-fabric schematic.

In addition or in the alternative, a first device may be identified from the first set of devices in the multi-fabric layout; the layout connectivity information may be determined for the first device from the layout connectivity information; and a first parasitic model based in part or in whole upon the device map. In some of these embodiments, the multiple design fabrics include two of an integrated circuit (IC) design fabric, an IC package design fabric, and a printed circuit board (PCB) design fabric.

In some embodiments, the first parasitic model may be parsed; and header information may be retrieved from the first parasitic model based in part or in whole upon results of parsing the first parasitic model. A first parasitic model instance of the first parasitic model may be instantiated in the multi-fabric schematic; a first number of ports, first port ordering, and first identifications of the first number of ports for the first parasitic model instance of the first parasitic model in the multi-fabric schematic may be determined based in part or in whole upon information in the first parasitic model or the layout connectivity information; and the first number of ports, the first port ordering, and the first identifications of the number of ports may be incorporated into the first parasitic model instance in some embodiments. In some of these embodiments, a second set of devices that corresponds to no available parasitic models for representing second set of devices may be identified in the multi-fabric schematic; and a second device may be identified from the second set.

In some of these embodiments, the second device from the second set may be represented as a conventional schematic instance; and the conventional schematic instance may be augmented with a second number of ports, second port ordering, and second identifications of the second number of ports for the second device. In the alternative, a second parasitic model may be constructed for the second device from the second set; and second parasitic model instance of the second parasitic model may be instantiated to represent the second device in the multi-fabric schematic, the second parasitic model instance including a second number of ports, second port ordering, and second identifications of the second number of ports for the second device.

In some embodiments, routing may be determined between a plurality of instances in the multi-fabric schematic; a third schematic instance of a third device may be identified from the multi-fabric schematic; a third parasitic model instance may be identified for the third device; the third schematic instance may be replaced with the third parasitic model instance; and the device map may be updated to modify binding information for the third device.

In some embodiments, one or more modifications may be implemented to the multi-fabric schematic or multi-fabric layout; and the multi-fabric layout, the multi-fabric schematic, and the device map may be synchronized based in part or in whole upon the one or more modifications. In addition, one or more verification tasks may be performed on the multi-fabric schematic, the one or more verification tasks including a layout-versus-schematic check; and one or more differences identified from the one or more verification tasks may be reported based in part or in whole upon results of performing the one or more verification tasks.

Some embodiments are directed at one or more hardware mechanisms that include and/or function in conjunction with at least one micro-processor as well as other related components or architectures of one or more computing systems and may be invoked to perform any of the methods, processes, or sub-processes disclosed herein. The hardware system may include one or more variants of a design implementation mechanism, a multi-fabric probing mechanism, a multi-fabric netlisting mechanism, a multi-fabric analysis mechanism, a multi-fabric checking and/or verification mechanism, and/or a multi-fabric view correlation mechanism in some embodiments.

Each of these mechanisms may include or function in tandem with electrical circuitry and one or more microprocessors each having one or more processor cores to perform its intended functions. The hardware system may further include one or more forms of non-transitory machine-readable storage media or persistent storage devices to temporarily or persistently store various types of data or information, various design rules, various libraries, selected and selectable targets, or any other suitable information or data, etc. A mechanism may be initialized in a computing system so that the software portion of the mechanism is stored in memory (e.g., random access memory) to be executed by one or more processors or processor cores off the computing system to perform at least a part of the functionality of the mechanism. Some illustrative modules or components of the hardware system may be found in the System Architecture Overview section below.

Some embodiments are directed at an article of manufacture that includes a non-transitory machine-accessible storage medium having stored thereupon a sequence of instructions which, when executed by at least one micro-processor or at least one processor core, causes the at least one micro-processor or the at least one processor core to perform any of the methods, processes, or sub-processes disclosed herein. Some illustrative forms of the non-transitory machine-readable storage media may also be found in the System Architecture Overview section below.

More details of various aspects of the methods, systems, or articles of manufacture for verifying connectivity of an electronic design are described below with reference to FIGS. 1-7B.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 4B illustrates an example of a device map that may be generated and referenced during the implementation of a layout-driven, multi-fabric schematic design of an electronic design in one or more embodiments.

DETAILED DESCRIPTION

Figure 1:
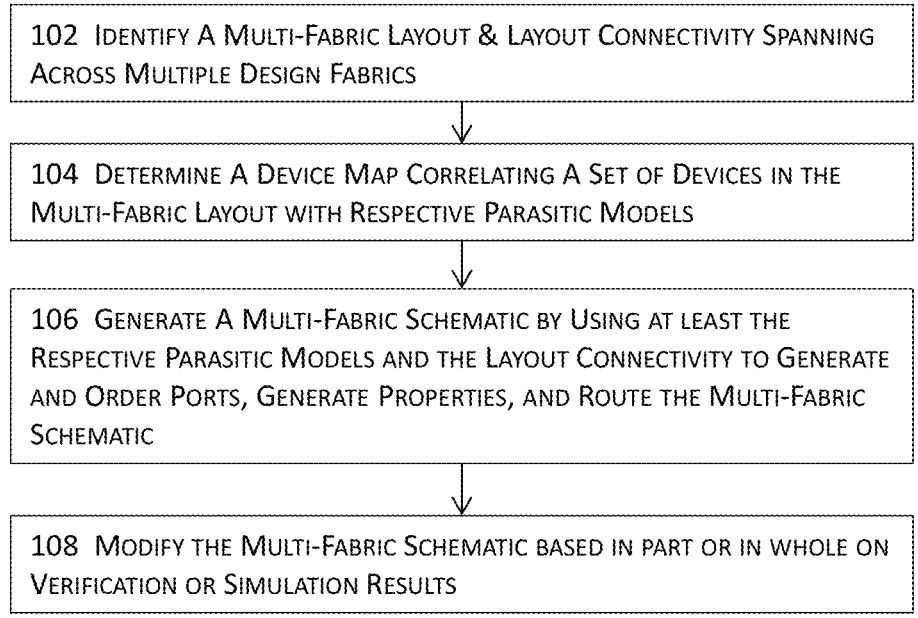
FIG. 1 illustrates a high level block diagram for implementing a layout-driven, multi-fabric schematic design of an electronic design in one or more embodiments.

Various embodiments are directed to a method, system, and computer program product for implementing a layout-driven, multi-fabric schematic design of an electronic design. Other objects, features, and advantages of the invention are described in the detailed description, figures, and claims.

Some embodiments described herein are directed at an apparatus and method that automatically generate a multi-fabric schematic comprising parasitic models for various circuit component designs in an electronic design. The multi-fabric schematic is generated via a layout-driven process where a multi-fabric layout of an electronic design, a plurality of layout devices in the multi-fabric layout, and the layout connectivity are first identified, and parasitic models corresponding to the set of layout devices are identified from a device map for the layout. Schematic instances for the plurality of layout devices are then instantiated in the multi-fabric schematic by using the corresponding parasitic models identified from the device map.

A parasitic model representing a schematic instance may include, at the minimum, one or more inputs and one or more outputs of the corresponding layout device with the correct port ordering and port identifications in some embodiments. In these embodiments, the use of these parasitic models not only precisely captures the static and transient behaviors of their corresponding layout devices but also conserves computational resources such as runtime and memory footprint during any subsequent use of the multi-fabric schematic. More specifically, these parasitic models practically represent black boxes with inputs and resulting outputs without having to model internal details of the corresponding layout devices. In some other embodiments, a parasitic model may further include information (e.g., property identifications, property values, etc.) about one or more properties of the parasitic model itself or the corresponding layout device. These parasitic models may be automatically or interactively routed with straight flight-line segments or with orthogonal flight line segments between connected ports by using the layout connectivity information and the port identifications of connected parasitic models.

In some embodiments where no existing parasitic models exist for a layout device, this layout device may be modeled in the multi-fabric schematic as a conventional schematic instance augmented by connectivity information (e.g., port identifications, port ordering, etc.) and property information (e.g., property identifications, property values, etc.) in some of these embodiments. In some other embodiments, a new parasitic model may be constructed for this layout device and then inserted into the multi-fabric schematic design. The multi-fabric schematic may be modified in any possible manners, and the associated files or databases (e.g., the device map, the layout database, the schematic database, etc.) in one or more of the multiple design fabrics may be automatically updated accordingly. The multi-fabric schematic, the corresponding layout spanning across multiple design fabrics, and the device map may be verified against each other to ensure the correctness thereof. For example, layout-versus-schematic checks may be performed.

One of the advantages of these techniques described herein over conventional approaches is that these techniques consume much less computational resources of runtime and memory footprint in generating a cross-fabric simulatable schematic because a designer no longer needs to check out various layout or schematic instances from their respective databases (e.g., IC layout database, IC package layout database, PCB layout database, etc.) with respective native editing EDA (electronic design automation) tools to obtain various pieces of information (e.g., the number and names of ports, pins, or terminals for each instance) for the generation of a cross-fabric simulatable schematic. For example, these techniques may simply refer to the layout connectivity information and/or the header information, if available, of a parasitic model (e.g., an s-parameter model) to determine the number of ports, pins, or nets, and the order of these ports, pins, or nets.

Another advantage of these techniques described herein is that these techniques further conserve both the runtime and memory utilization in generating a cross-fabric simulatable schematic by eliminating guesses, guesstimates, or estimates in determining, placing, routing via flight-line segments, and modifying a parasitic model in a cross-fabric simulatable schematic for a layout device. This is especially beneficial in modern electronic designs that often include some devices that may include hundreds of pins for each device. For example, a schematic representation of a layout device may be replaced by another schematic representation (e.g., by a parasitic model) by simply changing the reference or binding between the layout device and the schematic representation in a device map.

Another advantage of these techniques is that these techniques provide an efficient way to verify and ensure correctness of the generated cross-fabric simulatable schematic with respect to the layout and also with respect to the corresponding schematics in multiple design fabrics by efficiently and effectively verifying the cross-fabric simulatable schematic against the layout or against a device map by simple loop-up and comparison (e.g., by looking up a corresponding device in a layout and comparing various properties between the schematic instance and the corresponding device).

Another advantage of these techniques described herein is the that the designers no longer need to reconstruct the PCB and package design schematics around the IC chip design, and these techniques thus provide a net saving in time and effort. Another advantage is that connectivity information may be automatically extracted from various schematics from native schematic editors of corresponding design fabrics and/or layouts without or with little human intervention even in the absence of the PCB schematic or the IC package design schematic.

Another advantage of some techniques described herein is that the parasitic models extracted from various layouts may be automatically inserted in a multi-fabric schematic without or with little human intervention. Another advantage is that a designer no longer needs to keep track of design components that have been included in a parasitic model and thus need to be removed from the system schematic. Another advantage is that when one logical interface is distributed over multiple pins (e.g., an interface having five pins that are connected to $V_{DD}$), the interconnection between the logical interface and the multiple pins may be automatically furnished.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

A multi-fabric layout and layout connectivity of an electronic design spanning across multiple design fabrics may be identified at 102. The multiple design fabrics may include an IC design fabric, an IC package design fabric, and a PCB design fabric in some embodiments. Therefore, the multi-fabric layout may include multiple layouts (e.g., one or more IC layouts, one or more IC package layouts, a PCB layout, etc.) at their respective design fabrics. Each layout in its corresponding design fabric may be natively accessed and manipulated via its designated layout editing tool. For example, an IC package layout may be natively accessed by the designated IC package layout editing tool, but not by the other IC layout editing tools such as IC layout editing tool, the PCB layout editing tool, etc. without conversion or translation.

In some other embodiments, rather than identifying a multi-fabric layout of an electronic design, a plurality of schematic designs of an electronic design spanning across multiple design fabrics may be identified at 102. The plurality of schematic designs include their respective schematic instances at their respective design fabrics of these multiple design fabrics. In some other embodiments, the electronic design may include one or more layouts and one or more schematics of an electronic design spanning across multiple design fabrics. For example, the electronic design identified may include the IC schematics (in the IC design fabric) for one or more ICs in a plurality of ICs in a system design, a PCB layout (in the PCB design fabric), and one or more IC package schematics (in the IC package design fabric) for the system design.

A plurality of inputs may be determined at 104 for the automatic generation of multi-fabric schematic of the electronic design. The plurality of inputs may be pre-existing from one or more processes that have been performed in some embodiments or may be generated anew as intermediate outputs of one or more processes in some other embodiments. The plurality of inputs may include, for example, a device map that includes the information mapping a plurality of devices in the identified electronic design to their respective parasitic models. For example, a device map may include the two-port s-parameter models or spice models for resistors, capacitors, inductors, or any other circuit devices that may be included in electronic designs. In some embodiments where a device map is already available, determining a device map may include identifying the available device map from, for example, a repository. In some other embodiments where the device map is not yet available, determining a device map may include generating the device map. Device maps may be generated in different ways that are described in greater details below with reference to at least FIGS. 2A-2C and 4A.

The plurality of inputs may also include connectivity information in one or more design fabrics of the multiple design fabrics across which the system design spans. The connectivity information may include layout connectivity, schematic connectivity, or any combinations thereof. For a device of interest, the connectivity information identified may include, for example, the number, locations, and/or identifiers of pins, ports, terminals, or pads (collectively ports for plural or port for singular) of the device. This identified connectivity information may be further referenced for the plurality of devices in the automatic creation of the multi-fabric schematic.

A multi-fabric schematic may be generated at 106 at least by using the corresponding parasitic models for the plurality of devices in the electronic design and the connectivity information. For example, the design implementation modules 702 may function in conjunction with one or more other modules (e.g., the multi-fabric netlisting modules 706, the multi-fabric analysis modules 708, etc.) to insert and place the corresponding parasitic models at randomly chosen or designated locations into the multi-fabric schematic by referencing the device map. In some embodiments, the multi-fabric schematic may be generated to include all the schematic instances for the set of devices in the corresponding layout as well as the routing information without any human intervention.

For devices for which no parasitic models exist, these techniques may instantiate corresponding schematic instances as conventional schematic instances and augment these conventional schematic instances with parasitic information extracted from the corresponding layouts with corresponding native layout editing tools, connectivity information identified at 102, etc. These techniques described herein may further interconnected these parasitic models and augmented conventional schematic instances, if any, by routing non-topological interconnections (e.g., straight or orthogonal flight-lines) among these parasitic models and augmented conventional schematic instances, if any. The generated multi-fabric schematic thus include a plurality of parasitic models (e.g., s-parameter models, SPICE models, other suitable models, or any combinations thereof) and may be statically or dynamically simulated to obtain, for example, static, time- or frequency-dependent circuit behaviors, stability analysis results, noise analysis results, power analysis results, etc. for the electronic design.

The multi-fabric schematic generated at 106 may be further modified at 108. In some embodiments, further modifications to the multi-fabric schematic may be performed based in part or in whole upon results of verification and/or simulations performed on or with the generated multi-fabric schematic. These modifications may further include updating a schematic instance, which may or may not be represented as a parasitic model in the multi-fabric schematic design, with a parasitic model. For example, a modification may change the binding between a first schematic instance and a non-parasitic model to updated binging between the first schematic instance and a newly determined parasitic model. As another example, a modification may change the binding between a second schematic instance and a first parasitic model to updated binging between the second schematic instance and a different parasitic model.

Figure 2A:
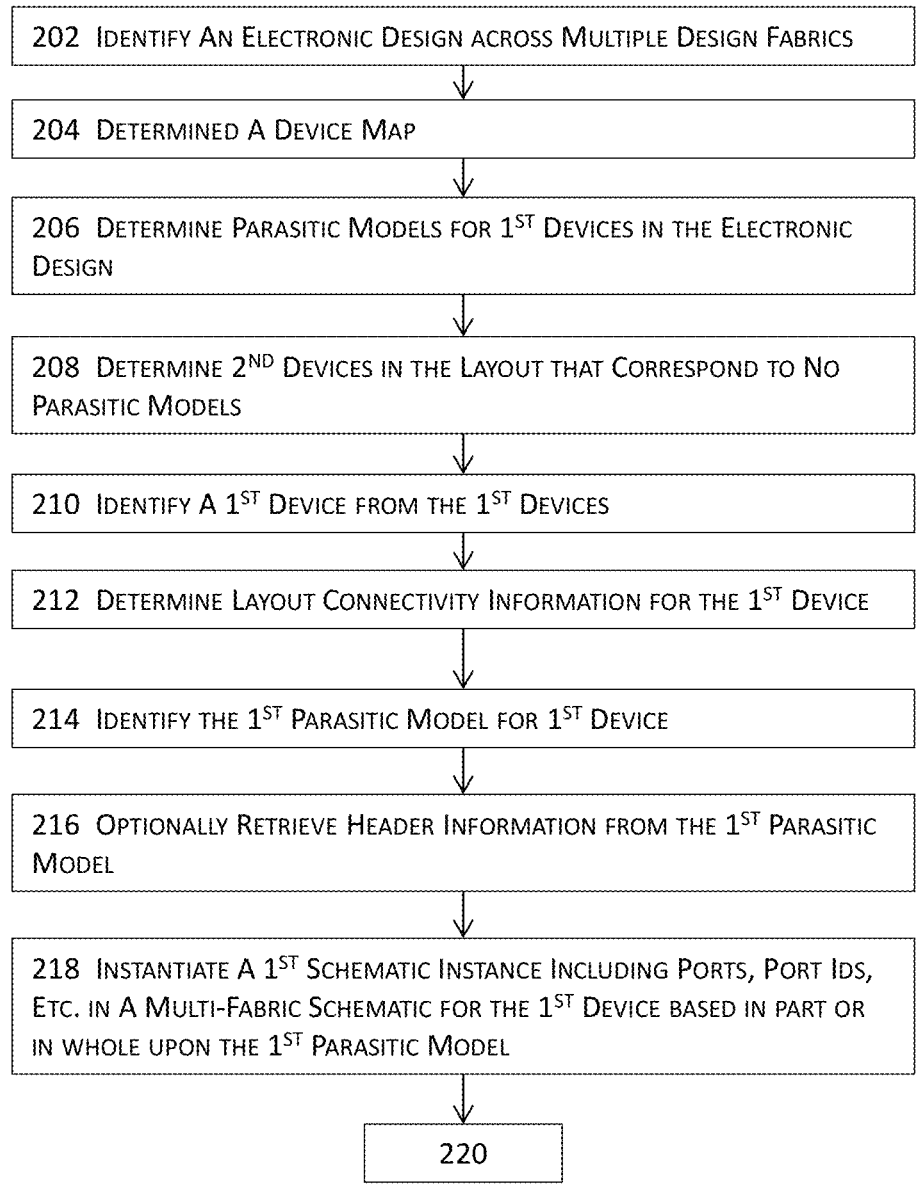
FIGS. 2A-2C jointly illustrate a more detailed level block diagrams for implementing a layout-driven, multi-fabric schematic design of an electronic design in one or more embodiments.
Figure 2B:
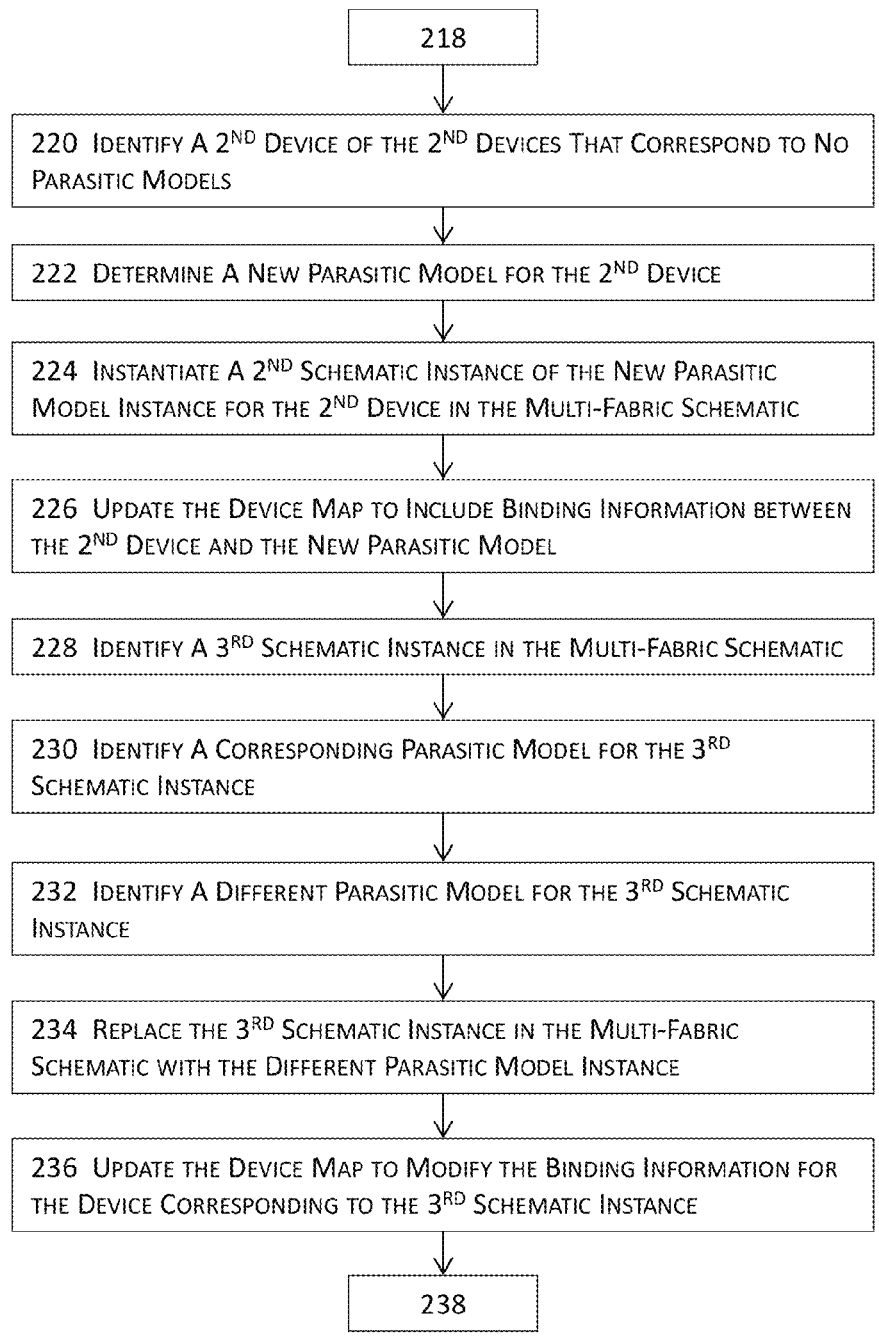
Figure 2C:
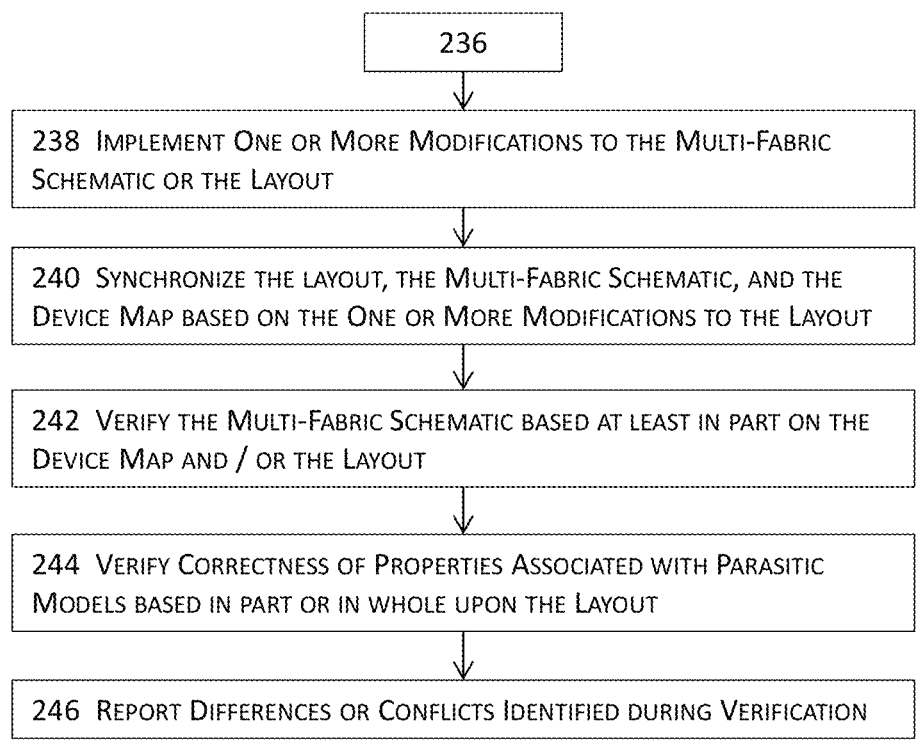

FIGS. 2A-2C jointly illustrate a more detailed level block diagrams for implementing a layout-driven, multi-fabric schematic design of an electronic design in one or more embodiments. An electronic design spanning across multiple design fabrics may be identified at 202; and a device map for the electronic design may be determined at 204. In some embodiments where a device map for the electronic design does not exist, a device map for the electronic design may be constructed by traversing or parsing the identified electronic design to retrieve device information of a plurality of devices in the electronic design, and to look up the corresponding parasitic models for at least some of the plurality of devices from a library of parasitic models based on the information provided by the device map. In some embodiments, a device map may include links to device or parasitic models of devices so that various techniques described herein may follow these links to retrieve desired parasitic or device models to conserve computational resources by avoiding more example processing and network round trips incurred by, for example, queries or other means for retrieving these device or parasitic models. The information linking the plurality of devices and their corresponding parasitic models may then be populated into a device map template to create the device map for the electronic design identified at 202. It shall be noted that a parasitic model may or may not necessarily include parasitics or parasitic effects, and that a parasitic model may refers to any model of a device such as an s-parameter model, a SPICE model, etc.

The parasitic models for a first set of devices in the electronic design may be determined at 206. In some embodiments, the first set of devices includes the devices whose corresponding parasitic models already exist, and these techniques identify these corresponding parasitic models for the first set of devices at 206. A second set of devices for which no parasitic models exist may also be determined at 208. In some embodiments, the second set of devices may be modeled as conventional schematic instances in the multi-fabric schematic. These conventional schematic instances may be augmented as described above with reference to 106 of FIG. 1. In some other embodiments, one or more new parasitic models may be constructed for one or more devices in the second set of devices. More details about constructing a new parasitic model will be described below with reference to FIGS. 2E-2F.

A first device may be identified at 210 from the first set of devices; and the layout connectivity information for the first device may be identified at 212. The layout connectivity information may include, for example, port identifiers of the first device, port ordering for the ports of the first device, information about the nets or net segments connected to the input(s) and output(s) of the first device, etc. This layout connectivity information may be referenced subsequently in routing the multi-fabric schematic. The first parasitic model corresponding to the first device may be identified at 214. In some embodiments, the first parasitic model may be available and may thus be identified from a repository. For example, the first parasitic model may have been constructed or may be provided by the manufacturer or IP (intellectual property) owner of the first device. In some other embodiments where no existing parasitic models exist for the first device, the first parasitic model may then be determined and constructed anew as described in greater details with reference to FIGS. 2E-2F. The first parasitic model may include, for example, an s-parameter model determined based in part or in whole on the s-parameters or the s-parameter matrix for the first device or a SPICE model that may be constructed anew or transformed from the s-parameter model.

In some embodiments where the first parasitic model includes header information, this header information may be optionally retrieved at 216 from the first parasitic model. This header information may include, for example, the total number of ports, port identifications, mapping information between model ports and device pins, and/or port ordering information for a plurality of ports, the common ground plane or ground net of the first device, etc. It shall be noted that header information listed above may not necessarily be needed or required for 2-port devices having one input port and one output port such as resistors, capacitors, inductors, etc. in some embodiments. Therefore, the header information will not be retrieved even if the header information is available from the parasitic models in these embodiments. In some of these embodiments, the parasitic models may not even include the aforementioned header information for retrieval.

A first schematic instance for the first parasitic model may be instantiated in the multi-fabric schematic at 218. This first schematic instance then represents the first device in the multi-fabric schematic and includes the information (e.g., s-parameter values) in the first parasitic model as well as other information such as property names and property values for the first device from the device map, connectivity information from the layout connectivity, etc.

A second device may be identified at 220 from the second set of devices that correspond to no existing parasitic models. A new parasitic model may then be determined at 222 for the identified second device. This new parasitic model may be provided by the manufacturer or IP owner of the second device or may be constructed anew as described below with reference to FIGS. 2E-2F. A second schematic instance of the new parasitic model may be instantiated at 224 for the second device in the multi-fabric schematic; and the device map including mapping between devices and their corresponding parasitic models as well as property identifications and values may be updated at 226 to include the mapping and various other pieces of information between the second device and this new parasitic model. These techniques then proceed through all the devices in the identified electronic design until the schematic instances for all the devices have been inserted into the multi-fabric schematic.

Either before or after the schematic is routed, the multi-fabric schematic may be modified. For example, a third schematic instance may be identified at 228 in the multi-fabric schematic. A corresponding parasitic model may be identified at 230 for the third schematic instance. A modification may be done to replace the corresponding parasitic model for the third schematic instance with a new parasitic model. More specifically, a different parasitic model for the third schematic instance may be identified at 232; and the third schematic instance in the multi-fabric schematic may be replaced with an instance of the different parasitic model at 234 such that this instance of the different parasitic model includes the information (e.g., s-parameter values) in the different parasitic model as well as other information such as property names and property values for the third device from the device map, connectivity information from the layout connectivity, etc.

In some of these embodiments where one schematic instance of a device is replaced with another schematic instance of the same device, the port ordering or even the port locations are maintained so that any existing routing information that may affect or may be affected by the replacement is eliminated or reduced. Once the replacement is done, the device map may be updated at 236 to modify the binding information to include mapping between the new parasitic model and the underlying device.

The multi-fabric schematic or the corresponding layout spanning across multiple design fabrics may be accessed and edited as conventional schematics and layouts. For example, one or more further modifications may be implemented at 238 to the multi-fabric schematic, the corresponding layout, and/or the device map. These one or more further modifications may include, for example, modifications to one or more parasitic models, replacements of devices with newly identified or constructed parasitic models, changes in the connectivity, etc. The multi-fabric schematic, the layout spanning across multiple design fabrics, and the device map may be synchronized at 240 based in part or in whole upon the one or more modifications performed at 238 to ensure that the multi-fabric schematic, the layout spanning across multiple design fabrics, and the device map are consistent with each other. By synchronizing the multi-fabric schematic, the layout, and the device map, the multi-fabric schematic, the layout, and the device map are consistent with each other and do not include conflicting or inconsistent information. For example, a property value for a device in the device map is consistent with the property value explicitly specified or implicitly referred to in the multi-fabric schematic and the corresponding layout when the multi-fabric schematic, the layout, and the device map are synchronized. Synchronization may include not only the design characteristics but also properties, connectivity, etc.

The generated multi-fabric schematic, the device map, and the corresponding layout may also be verified against each other at 242. For example, the multi-fabric schematic may be verified against the corresponding layout in a layout-versus-schematic (LVS) verification task to determine whether the devices corresponding to the schematic instances in the multi-fabric schematic are in the corresponding layout, or whether the schematic connectivity information from the multi-fabric schematic is consistent with or identical to the layout connectivity from the corresponding layout. As another example, the multi-fabric schematic may be verified against the device map to determine, for example, whether the schematic instances in the multi-fabric schematic are listed in the device map, or whether the parasitic models pointed to by schematic instances or schematic symbols are consistent with the parasitic models listed in the device map. The correctness or consistency of properties associated with the parasitic models, the corresponding layout, and/or the multi-fabric schematic may also be verified at 244 against each other. For example, the verification task may determine whether the corresponding properties associated with the multi-fabric schematic, the corresponding layout, and the device map are consistent with or identical to each other. Differences or mismatches identified during the verification at 242 and/or 244 may be reported at 246. For example, a mismatch in the instances, properties, property names, property values, etc. may be reported at 246.

Figure 2D:
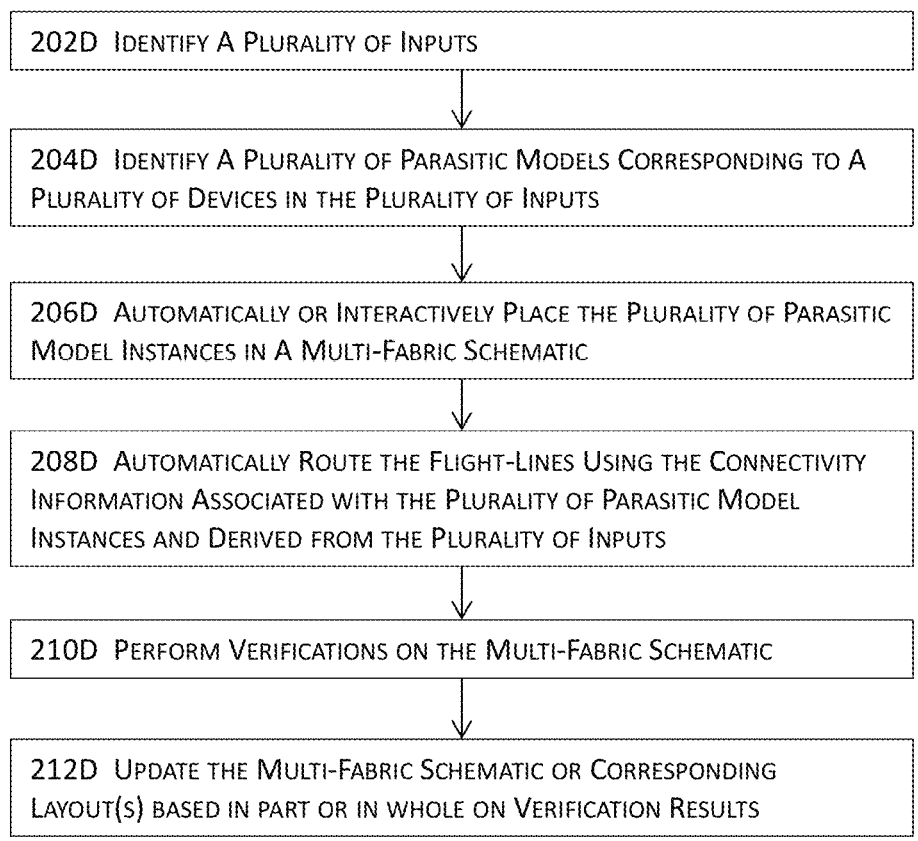
FIG. 2D illustrates another high level block diagram for implementing a layout-driven, multi-fabric schematic design of an electronic design in one or more embodiments.

FIG. 2D illustrates another high level block diagram for implementing a layout-driven, multi-fabric schematic design of an electronic design in one or more embodiments. More specifically, FIG. 2D illustrates a high level block diagram for a layout-driven generation of a multi-fabric schematic. In these one or more embodiments, a plurality of inputs may be identified at 202D. The plurality of inputs may include, for example, a multi-fabric layout including the PCB layout, one or more IC package layouts, one or more IC layouts corresponding to the one or more IC package layouts. The plurality of inputs may further include, for example, layout trace parasitic models or models of layout traces (e.g., s-parameter models or SPICE models for traces, wires, or interconnects that connect two or more devices or circuit component designs), a device map mapping a list of devices in the multi-fabric layout to their corresponding parasitic models, if available. At least some of the plurality of inputs (e.g., models of layout traces, connectivity, etc.) may be identified from corresponding layout(s) and may be further used to create a multi-fabric schematic for analyses and simulations. It shall be noted that a parasitic model (e.g., a model of a device) described herein includes a schematic model of a layout device instance, and this schematic model of a layout device may be used to create the corresponding multi-fabric schematic. In contrast, a model of a layout trace includes a model of a trace or a wire connecting two layout circuit component designs, and this model of a layout trace may also be used to represent the trace or wire in the multi-fabric schematic.

A plurality of parasitic models (e.g., s-parameter models, SPICE models, or any combinations thereof) corresponding to a plurality of devices in the multi-fabric layout may be identified at 204D. The plurality of parasitic models may be automatically or interactively placed at 206D in a multi-fabric schematic, and the multi-fabric schematic may be automatically routed at 208D with straight or orthogonal non-topological interconnections (e.g., flight lines). The generated multi-fabric schematic may be verified or analyzed at 210D; and the multi-fabric schematic or the corresponding multi-fabric layout (or any layouts in their respective design fabrics) may be updated at 212D based in part or in whole upon the results of verification or analyses.

Figure 2E:
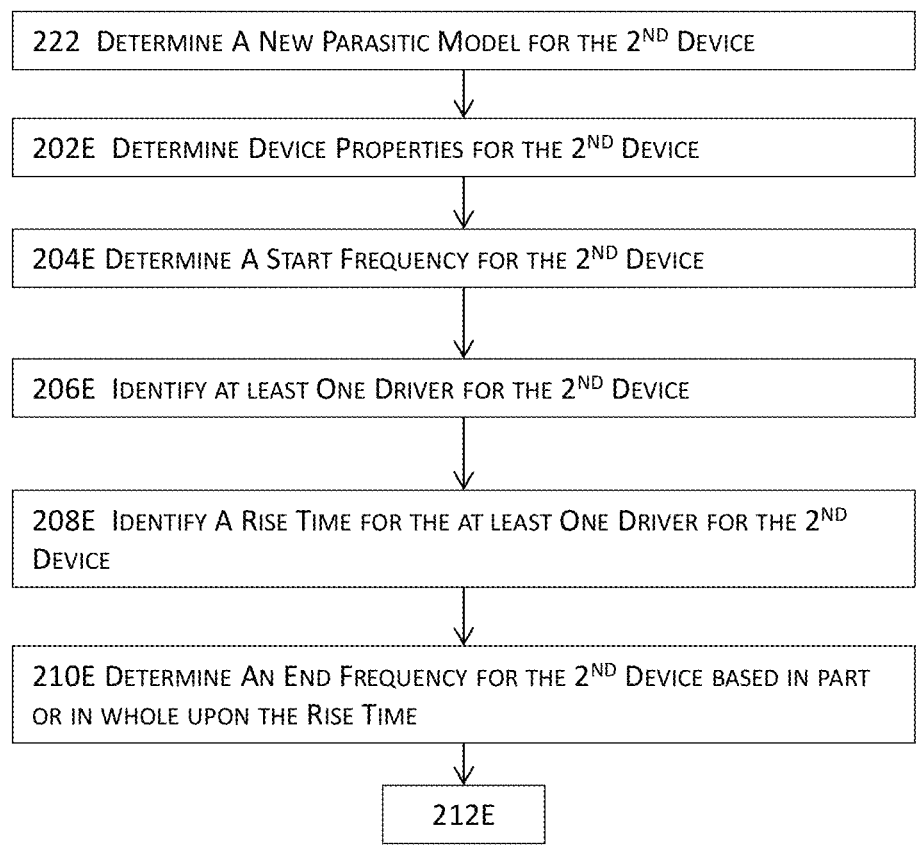
FIGS. 2E-2F jointly illustrate a more detailed level block diagrams for a block in the block diagram illustrated in FIGS. 2A-2C in one or more embodiments.
Figure 2F:
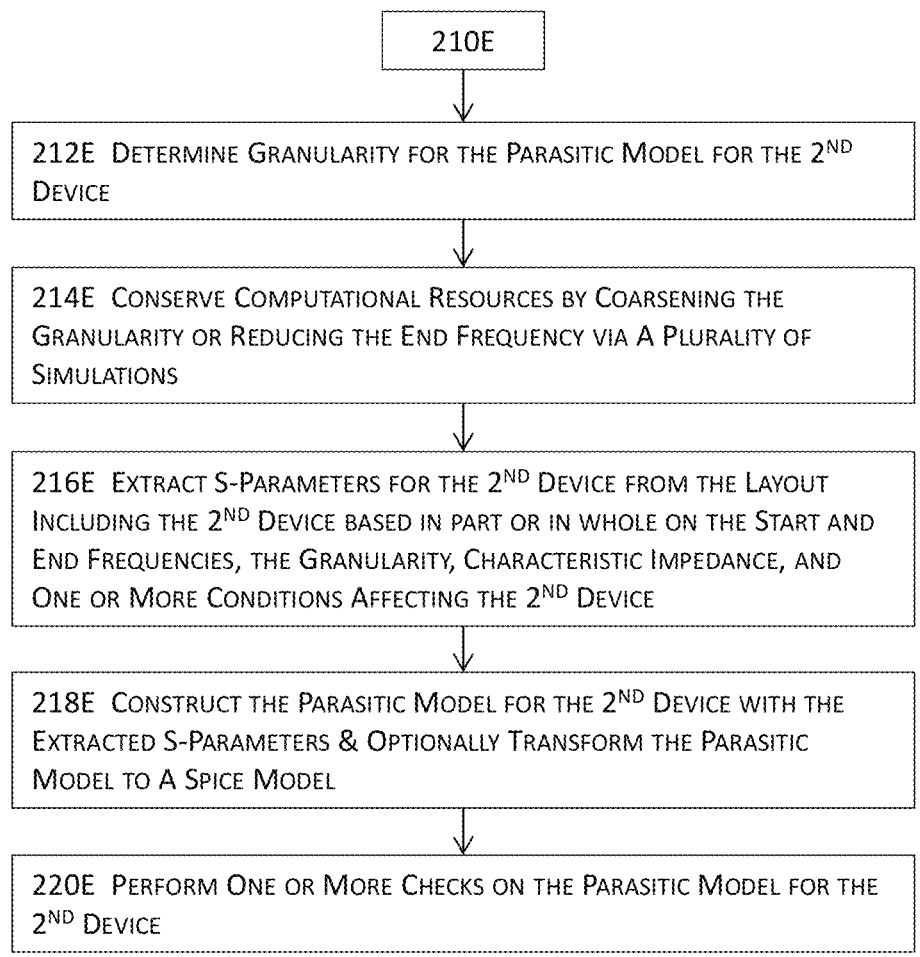

FIGS. 2E-2F jointly illustrate a more detailed level block diagrams for a block in the block diagram illustrated in FIGS. 2A-2C in one or more embodiments. More specifically, FIGS. 2E-2F jointly illustrate a block diagram for determining a parasitic model for a device for which no existing parasitic models exist. In these embodiments, device properties for the device may be determined or identified at 202E by, for example, extraction from the multi-fabric layout. More specifically, these device properties may be extracted by using native layout editing tools to extract these device properties from the corresponding layouts.

These device properties may include, for example, s-parameters for one or more devices in the multi-fabric layout. These device properties for the device may also be identified either from the multi-fabric layout or from other sources such as the design specification including the device. For example, the s-parameter values may be extracted from layout including the device by using the native layout editing tool for the design fabric to which the device is modeled natively. The total number of pins, pin identifications, pin ordering, or any other connectivity information may be also be identified from the layout connectivity that may be accessed by using native layout editing tools to natively access and extract the connectivity. The ground pin and/or the ground net for the device may also be identified.

It shall be noted that the aforementioned device properties are provided as examples, and not all the aforementioned device properties may be needed or desired in some embodiments, while some other embodiments may include one or more additional device properties, in addition to the ones listed above. These device properties may be associated with the parasitic model to be constructed with the techniques described in FIGS. 2E-2F or equivalent techniques.

With these device properties, a parasitic model may be constructed for the device. The following processes may be used to generate an s-parameter model. A SPICE model may be translated from the generated s-parameter model or may be constructed by any known techniques. For example, a SPICE model may be constructed by using a .MODEL card for basic circuit elements such as transistors, diodes, etc. or by using a sub-circuit model including basic circuit elements or a behavior model using, for example, formulae to approximate behavior of the device being modeled.

S-parameters or the s-parameter matrix for a device delineates the relation between the incident wave and the reflected wave at a port of the device. As a result, the frequency range, the frequency step for sweeping the frequency range, the characteristic impedance of the device, the number of ports of the device, and conditions such as temperature, control voltage, bias current, etc. that may affect the device may be defined in constructing an s-parameter for the device.

In some embodiments, a start frequency for the device may be determined at 204E. The start frequency may be identified as zero (0) hertz (Hz), if possible, or 10 MHz or lower if zero Hz is not possible in some embodiments. At least one driver or driving signal (hereinafter driver) may be identified at 206E, and the rise time for the at least one driver may be identified at 208E. In some embodiments, the rise time may be identified as 20% to 80% of the driver. In some other embodiments, the rise time may be 0-100% of the rise time for the driver.

One or more time steps in the time domain may be identified to be a fraction of the rise time identified at 208E. An end frequency may then be determined at 210E based in part or in whole upon the rise time identified at 208E. In some embodiments, an end frequency may be determined based on the time step used to capture the behavior of the driver during the rise time determined at 208E. A time step may be determined by balancing the accuracy in capturing the behavior of the driver during the rise time identified at 208E and the computational costs in capturing such a behavior.

For example, smaller time steps more accurately capture the behavior of the driver during the rise time yet require more runtime. On the other hand, larger time steps conserve computational resources but produce less accurate result of the behavior of the driver during the rise time. In these embodiments, an end frequency may be determined at 210E to be a fraction of the reciprocal of the determined time step. For example, a time step ($\delta t$) may be determined to be one-tenth ($\frac{1}{10}$) of the rise time ($T_R$) or ($\delta t = T_R/10$); and the end frequency may be determined to be one-half of the reciprocal of the time step or ($1/(2 \times \delta t)$) or ($T_R/20$).

The start and end frequencies determine the frequency range in which s-parameter values may be determined. Therefore, the larger the frequency range, the larger the size of the s-parameter model will be. Reducing the end frequency may thus result in a smaller file size for the s-parameter model and shorter runtime in determining the s-parameter values and in subsequent analyses with the s-parameter models. In some embodiments where the s-parameter model is sufficiently linear or the behavior of the device is sufficiently linear with non-linearity that may be neglected, the end frequency may be reduced to result in a smaller file for the s-parameter model and hence better performance in terms of shorter runtime and a smaller memory footprint in performing analyses or simulations with the s-parameter model. In some embodiments, two or more analyses or simulations may be performed with different end frequencies, and the end frequency may be more appropriately trimmed or reduced by comparison the results of these two or more analyses or simulations.

Granularity for the parasitic model may be determined at 212E for the device. The granularity represents the resolution within the frequency range defined by the start frequency and the end frequency. For example, one or more uniform or non-uniform frequency steps may be determined at 212E to sweep the frequency range by balancing accuracy and computation resource utilization. In some embodiments, a frequency step of 10 MHz may be determined at 212E. In some of these embodiments, a frequency step first determined at 212E may also be increased at 214E within a portion of or throughout the frequency range.

For example, the frequency step may be increased to provide a lower resolution over the frequency range when the behavior of the device is sufficiently linear with non-linearity that may be neglected or compromised. If the end frequency has not been improved or optimized, the end frequency may also be reduced at 214E to further reduce the computational resource utilization by shrinking the size of the s-parameter model, spending less runtime to obtain the s-parameter values, and hence utilizing a smaller footprint and shorter runtime in handling the s-parameter model during subsequent analyses or simulations.

In some embodiments, the s-parameter values may be extracted for the device from the layout including the device with the native layout editor for the design fabric in which the device is modeled natively at 216E based in part or in whole upon the start frequency, the end frequency, the granularity, and one or more of the device properties determined above. The s-parameter model may then be constructed at 218E for the device with the extracted s-parameter values. In some of these embodiments, the s-parameter model constructed at 218E may be transformed into another parasitic model (e.g., a SPICE model) that may also be used to represent the device in the multi-fabric schematic. One or more checks may be performed at 220E on the parasitic model constructed at 218E for quality. These one or more checks may be performed based in part or in whole upon one or more criteria including, for example, passivity, reciprocity, time domain simulation, or any other desired or required criteria to verify whether the parasitic model, which appears to be a black box that does not include all the design details of the device, produces sufficiently accurate behaviors for the device.

Figure 3A:
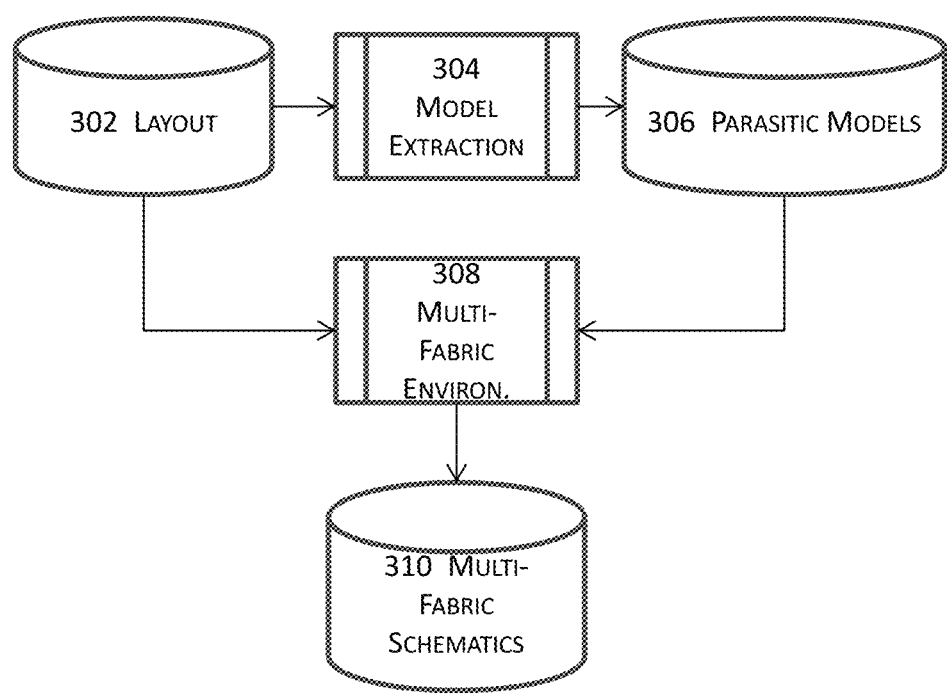
FIG. 3A illustrates a high level block diagram for data flows and interactions among some modules during the implementation of a layout-driven, multi-fabric schematic design of an electronic design in one or more embodiments.

FIG. 3A illustrates a high level block diagram for data flows and interactions among some modules during the implementation of a layout-driven, multi-fabric schematic design of an electronic design in one or more embodiments. In this example, a multi-fabric layout 302 may be identified, and various characteristics of the layout 302 such as layout connectivity, a list of devices in the layout, device properties, a device map etc. may be extracted or determined by the model extraction module 304. These characteristics may be provided as inputs to generate or identify parasitic models 306 for the list of devices in the multi-fabric layout. In the multi-fabric design environment 308, respective electronic design automation tools may be invoked to generate a multi-fabric schematic 310 in a layout-driven schematic generation process flow as described above with reference to FIGS. 1-2F.

Figure 3B:
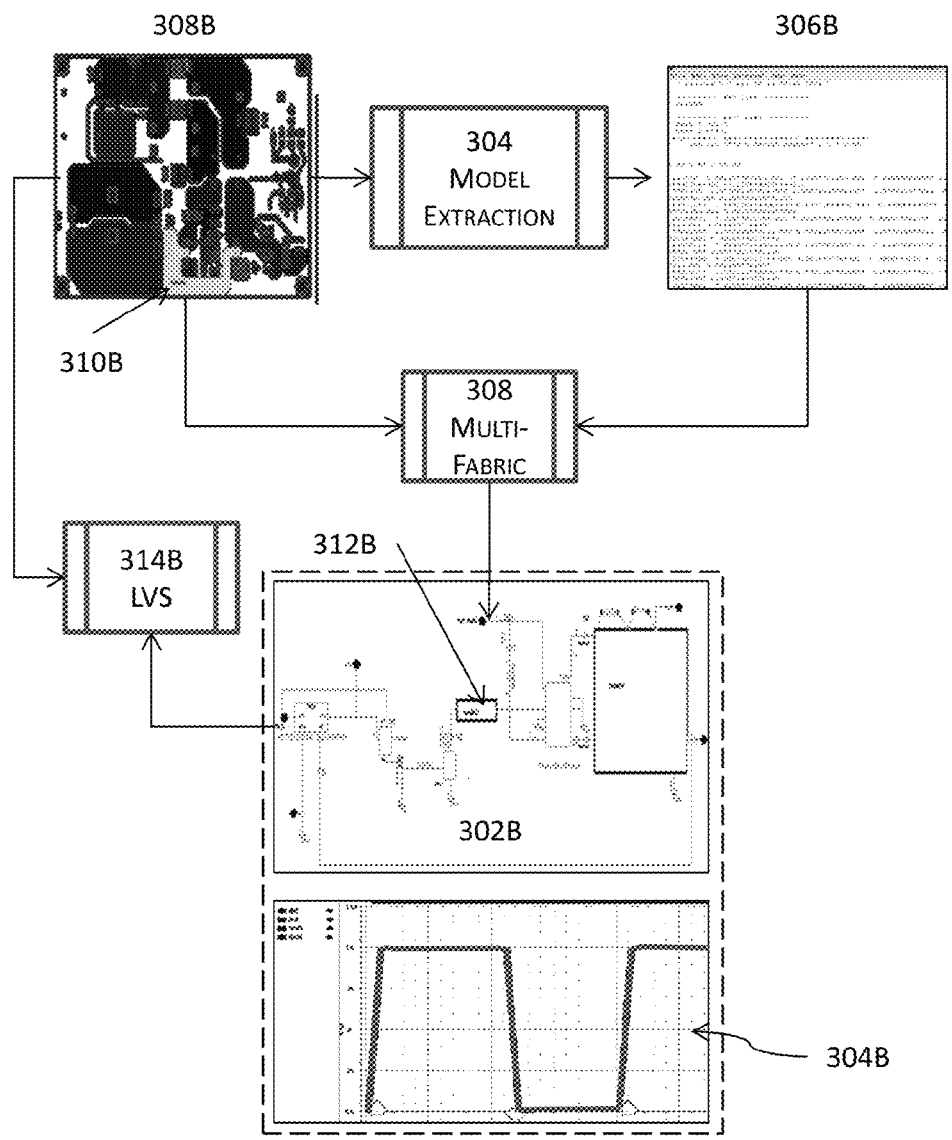
FIG. 3B illustrates another high level block diagram for data flows during the implementation of a layout-driven, multi-fabric schematic design of an electronic design in one or more embodiments.

FIG. 3B illustrates another high level block diagram for data flows during the implementation of a layout-driven, multi-fabric schematic design of an electronic design in one or more embodiments. In this example, a multi-fabric layout 308B may be identified, and various characteristics of the layout 302 such as layout connectivity, a list of devices in the layout, device properties, a device map etc. may be extracted or determined by the model extraction module 304. In this example, the model extract module 304 extracts or determines these characteristics for the device 310B in the layout 308B. These characteristics may be provided as inputs to generate or identify a parasitic model 306B for the device 310B in the multi-fabric layout.

In the multi-fabric design environment 308, respective electronic design automation tools may be invoked to generate a multi-fabric schematic 302B including the schematic instance 312B instantiated from the parasitic model 306B for the device 310B in a layout-driven schematic generation process flow as described above with reference to FIGS. 1-2F. The multi-fabric schematic 302B may then be analyzed in the context of the layout parasitics 304B that may be extracted from the multi-fabric layout 308B with the corresponding layout editing tools. The multi-fabric layout 308B and the multi-fabric schematic 302B may be verified against each other at, for example, a layout-versus-schematic module 314B to determine whether the multi-fabric layout 308B and the multi-fabric schematic 302B are consistent with each other.

Figure 3C:
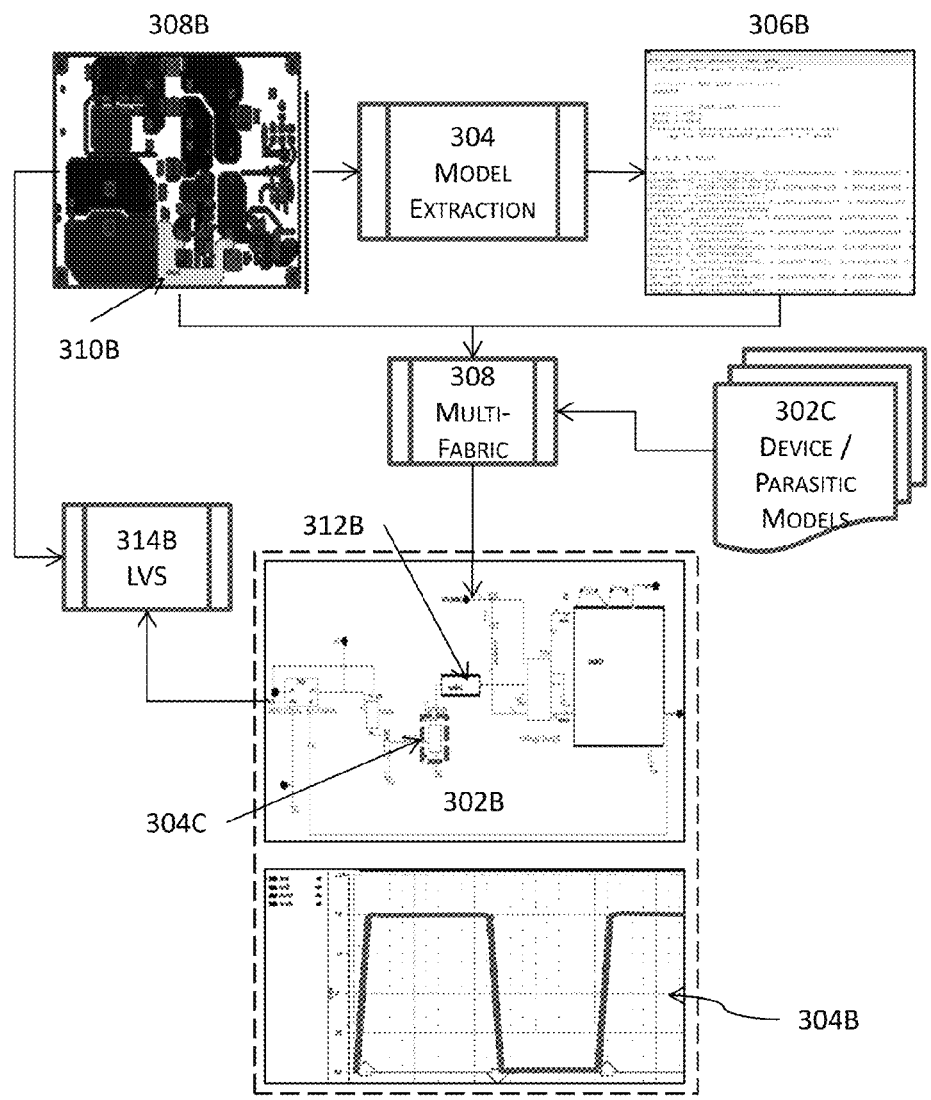
FIG. 3C illustrates another high level block diagram for data flows during the implementation of a layout-driven, multi-fabric schematic design of an electronic design in one or more embodiments.

FIG. 3C illustrates another high level block diagram for data flows during the implementation of a layout-driven, multi-fabric schematic design of an electronic design in one or more embodiments. More specifically, FIG. 3C illustrates a similar high level block diagram as FIG. 3B. Compared to FIG. 3B, the multi-fabric design environment 308 is provided with a set of device or parasitic models 302C that are mapped through a device map; and 304C represents an original schematic instance in the multi-fabric design may be replaced with a corresponding parasitic model or device model when the corresponding parasitic model or device model becomes available in the set of device or parasitic models 302C. As described above, a parasitic model may or may not necessarily include parasitics or parasitic effects and thus may be used interchangeably with a device model throughout this entire description, unless otherwise explicitly or specifically recited.

Figure 4A:
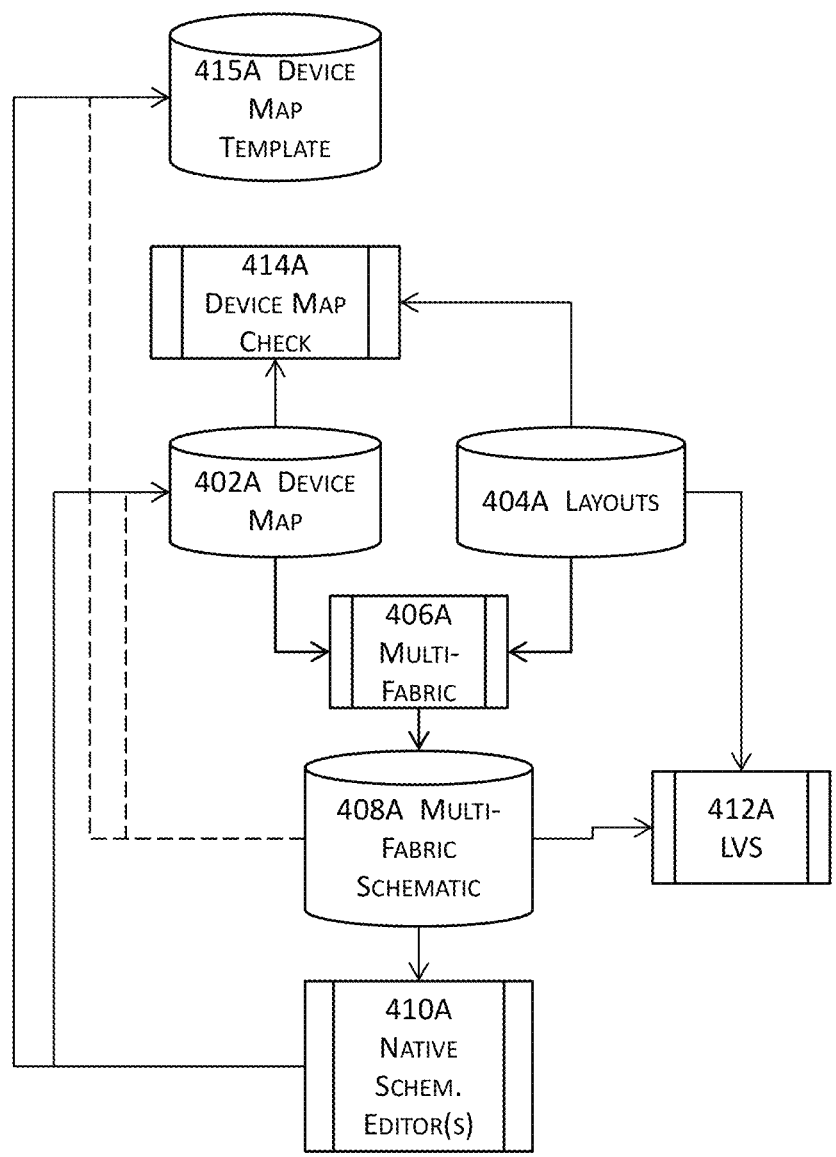
FIG. 4A illustrates a more detailed block diagram for data flows and interactions among some modules during the implementation of a layout-driven, multi-fabric schematic design of an electronic design in one or more embodiments.

FIG. 4A illustrates a more detailed block diagram for data flows and interactions among some modules during the implementation of a layout-driven, multi-fabric schematic design of an electronic design in one or more embodiments. In these embodiments, a multi-fabric layout 404A may be parsed and processed to generate the device map 402A by using a device map template. The device map 402A and the multi-fabric layout 404A may be checked at 414A against each other to determine whether the device map 402A and the multi-fabric layout 404A are consistent with one another. The multi-fabric layout 404A and the device map 402A may be provided to a multi-fabric design environment 406A to generate a multi-fabric schematic 408A that may be stored persistently in a storage device. This multi-fabric schematic 408A and the multi-fabric layout 404A may be checked against each other by a layout-versus-schematic tool 412A to ensure the consistency therebetween. The multi-fabric schematic 408A may also be processed to populate a device map template 415A to generate an updated device map. This may be especially useful when the multi-fabric schematic proceeds through a series of modifications with one or more native schematic editors 410A from its original creation. Alternatively, the original device map 402A may be updated according to the series of modifications.

FIG. 4B illustrates an example of a device map that may be generated and referenced during the implementation of a layout-driven, multi-fabric schematic design of an electronic design in one or more embodiments. More specifically, FIG. 4B illustrates an example device map 400B that may be used in layout-driven, multi-fabric schematic generation processes. As FIG. 4B shows, a device map may include device identifications as listed in the REFDES column and their respective parasitic models. It shall be noted that although FIG. 4B illustrates a table structure for the example device map where information of devices is stored in respective rows, a device map does not necessarily have to be stored in the illustrated format or even in a tabular format and may be stored in any data structures correlating devices in a layout and corresponding device or parasitic models. With a device map, computer memory may be configured according to the device map so that subsequent processing and generation of a multi-fabric schematic may not need as much computational resources. It shall be also noted that although the parasitic models in "S-Para. Model" column appear to refer to the identifications of the parasitic models corresponding to the list of devices in the REFDES column, a device map may store the mapping between devices and their parasitic models in any form. For example, the parasitic model field corresponding to a device may include a link (e.g., a pointer, a symbolic link, or any suitable reference, etc.) to the parasitic model. A device map, as shown in FIG. 4B, may also include one or more property identifications and their respective property values in some embodiments.

Figure 4C:
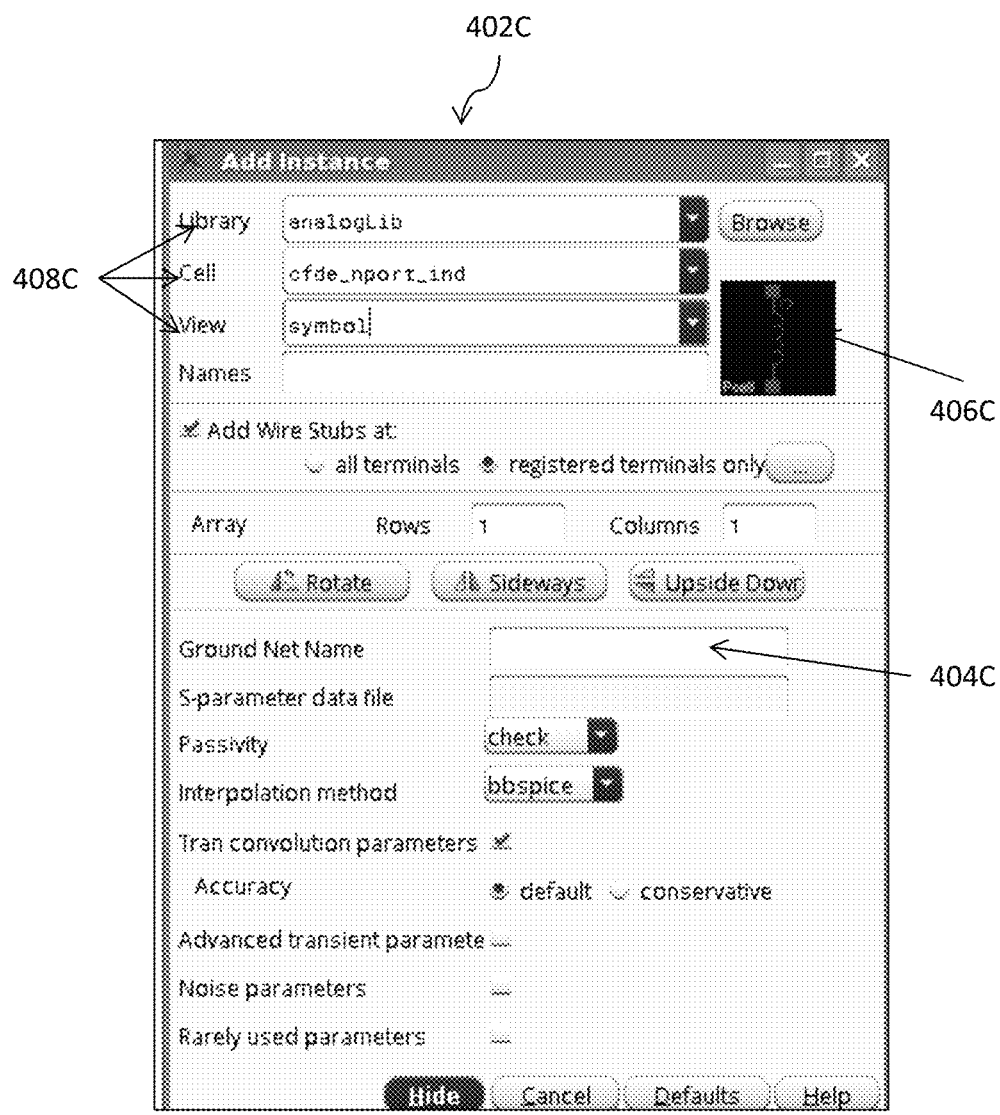
FIGS. 4C-4D illustrate an example of user interface to generate a parasitic model and some example parasitic models of two-port passive circuit component designs that may be used in the implementation of a layout-driven, multi-fabric schematic design of an electronic design in one or more embodiments.
Figure 4D:
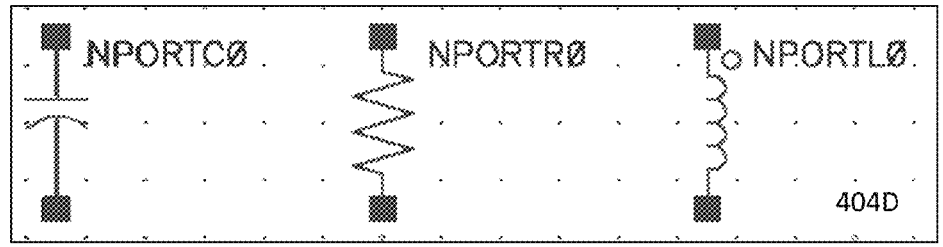

FIGS. 4C-4D illustrate an example of user interface to generate a parasitic model and some example parasitic models of two-port passive circuit component designs that may be used in the implementation of a layout-driven, multi-fabric schematic design of an electronic design in one or more embodiments. FIG. 4C illustrates an example user interface 402C that may be used to specify the input information for creating a schematic instance for a two-port passive device (e.g., an inductor as shown in 406C. The common ground for the schematic instance to be created may also be specified in 404C although this common ground may or may not necessarily be shown in the created schematic instance. That is, the common ground symbol or other related information may be configured to be shown in some embodiments or to be hidden or suppressed in the generated multi-fabric schematic to avoid having too much information in the multi-fabric schematic in some other embodiments.

The other input information such as the libraries, cells, and cell views 408C may also be specified for the instantiation of the schematic instance for the two-port device in the multi-fabric schematic. In these embodiments where a schematic instance of a parasitic model of a two-port passive device (e.g., a resistor, a capacitor, an inductor, etc.) is instantiated, the port ordering may not be important due to the nature of the two-port device. Therefore, the parasitic model needs not include the header information or at least the header information, if available, does not have to include port ordering information. In some of these embodiments where an s-parameter model is used to instantiate the schematic instance for the two-port device, the s-parameters are almost always extracted with respect to the ground. Therefore, the user interface provides for the user to specify the common ground (404C) for the schematic instance of the two-port device. The schematic instance for the two port device thus includes three terminals—the input, the output, and the ground terminal—where the ground terminal may be configured as a property of the schematic instance and may be configured to be displayed or hidden or suppressed in the multi-fabric schematic.

Moreover, FIG. 4D illustrates the parasitic model file 402D (an s-parameter model file) for the two-port passive device; and a schematic instance for the two-port device to be created via the user interface illustrated in FIG. 4C may be instantiated from the parasitic model file 402D in the multi-fabric schematic. FIG. 4D further illustrates the schematic instance symbols 404D that may be shown in the multi-fabric schematic to represent the two-port device. It shall be noted that these symbols, unlike conventional parasitic model symbols in schematics that represent circuit devices in generic polygonal boxes, graphically convey the type and meaning of the two-port device. It shall be also noted that these schematic symbols includes only two terminals but not the ground terminal. As described above, the ground terminal may be configured as a property of the schematic instance and may be configured to be displayed or hidden or suppressed in the multi-fabric schematic.

Figure 5A:
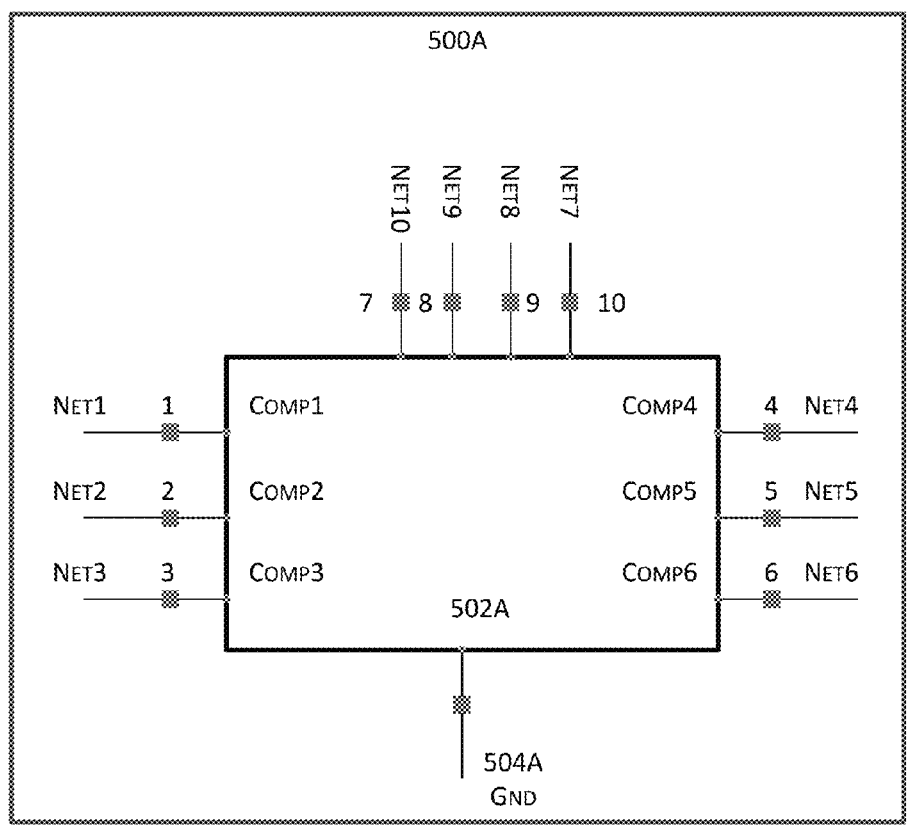
FIGS. 5A-5D illustrates an example of constructing a parasitic model for a layout device in one or more embodiments.
Figure 5B:
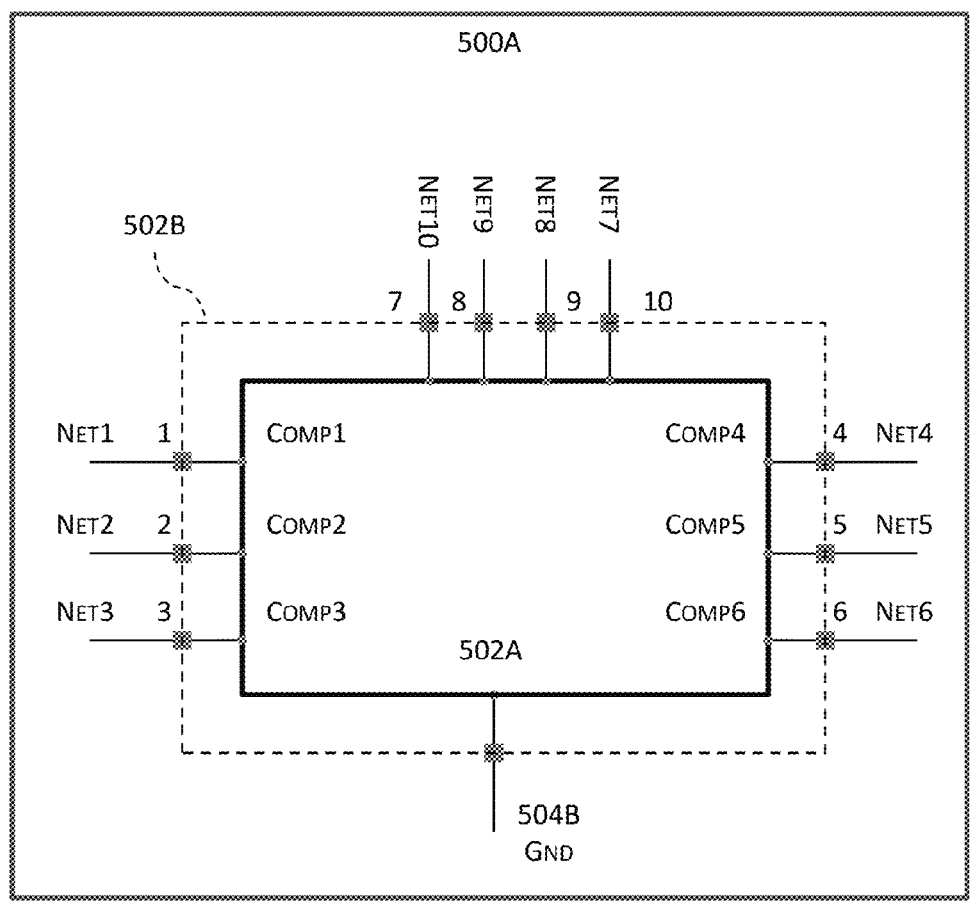
Figure 5C:
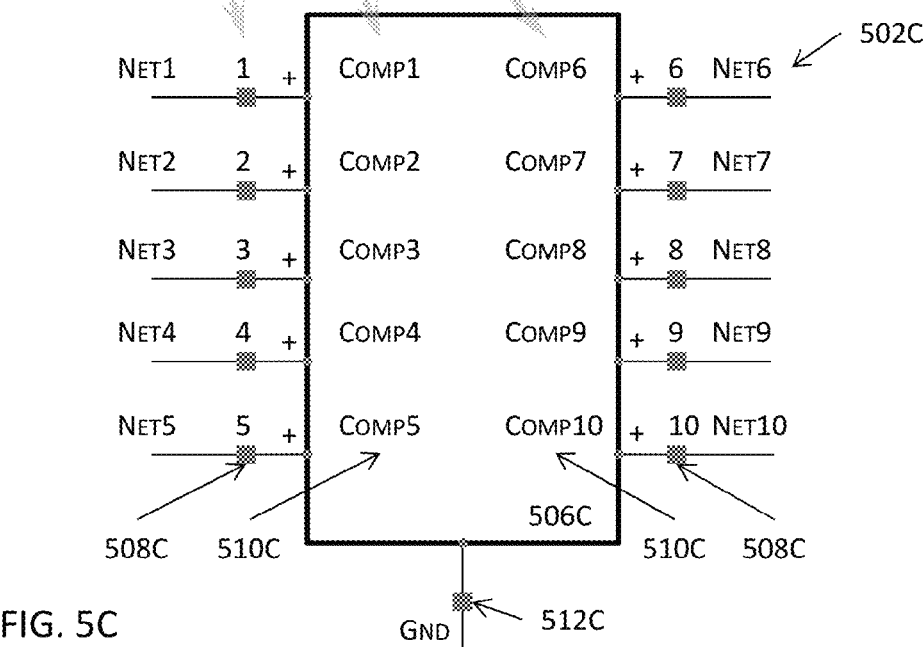
Figure 5D:
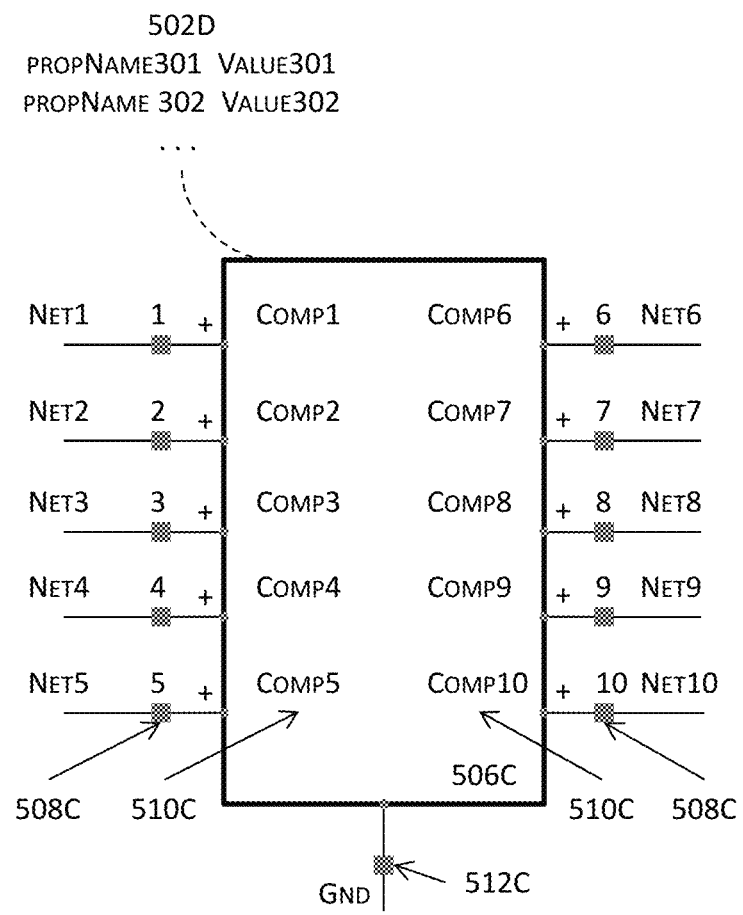

FIGS. 5A-5D illustrates an example of constructing a parasitic model for a layout device in one or more embodiments. More specifically, FIGS. 5A-5D illustrates the example where a conventional schematic instance 502A of a filter having a ground 504A in a multi-fabric schematic design 500A may be replaced with an instance of a parasitic model 502B while preserving one or more characteristics of the conventional schematic instance 502A may be preserved. A user may identify the conventional schematic instance 502A by clicking on or selecting the conventional schematic instance 502A by clicking the corresponding schematic instance in the graphic display area or the corresponding schematic instance 502A in a navigation panel textually listing instances or dragging to create a window to enclose the conventional schematic instance 502A. A ground net or terminal 504B may also be added to the parasitic or device model 502B. A parasitic model may be identified, if available, or created, if non-existing, as shown in FIGS. 5C-5D below.

FIGS. 5C-5D illustrate an example of construction of a parasitic model for the implementation of a layout-driven, multi-fabric schematic design of an electronic design that may be used to replace the conventional schematic instance 502A in one or more embodiments. FIG. 5C illustrates the example of a parasitic model file and the corresponding schematic instance for the complex, multi-port device represented by the conventional schematic instance 502A in FIGS. 5A-5B in one or more embodiments. In this example, these techniques described herein may reference the parasitic model 504C to generate and instantiate the corresponding schematic instance for the complex ten-port device (e.g., a filter). More specifically, the port ordering information 524C and 526C may be parsed and retrieved from the parasitic model file 504C and populated in the generated schematic instance 506C.

For example, the port numbers 524C in the parasitic model 504C may be populated into the corresponding port numbers 508C in the schematic instance 506C; and the port names 526C in the parasitic model 504C may be populated into the corresponding port identifications 510C in the schematic instance 506C. The header information of the parasitic model 504C may also include the ground terminal or ground net information 522C; and this ground terminal or ground net information 522C may also be populated to the corresponding ground terminal 512C in the corresponding schematic instance 506E. The connectivity information 502C in the corresponding schematic instance 506C may be obtained from the layout connectivity information as described above.

FIG. 5D illustrates an example of the schematic instance illustrated in FIG. 5C for the ten-port device where the schematic instance may be further augmented with additional information in one or more embodiments. In this example, the schematic instance 506C may be further augmented with the property information 502D (e.g., one or more property names, one or more corresponding property values, etc.) that may be obtained from other inputs such as the device map (e.g., the device map 400B). This additional information may be associated with, stitched to, or annotated in the schematic instance 506C. In addition, the schematic instance may be configured to show or hide this additional piece of information. After the parasitic model 506C is identified (if existing) or created (if non-existing), the conventional schematic instance 502A in the multi-fabric schematic 500A may be replaced with the parasitic model 506C.

FIGS. 6A-6E illustrate an example of a layout-driven generation of a multi-fabric schematic for an electronic design in one or more embodiments. In this example, a user may select from a series of commands 602A from a user interface 600A. In this example, the series of commands 602A includes the command for generating a multi-fabric schematic with automatic placement, and the command for generating a multi-fabric schematic with interactive placement of schematic instances. By using various techniques described above, a list of devices, the respective pin counts, and the available mapped parasitic models for each device in the list may be shown as 602B in the schematic editor display window 600B in FIG. 6B by, for example, retrieving the pertinent information from a device map.

Figure 6A:
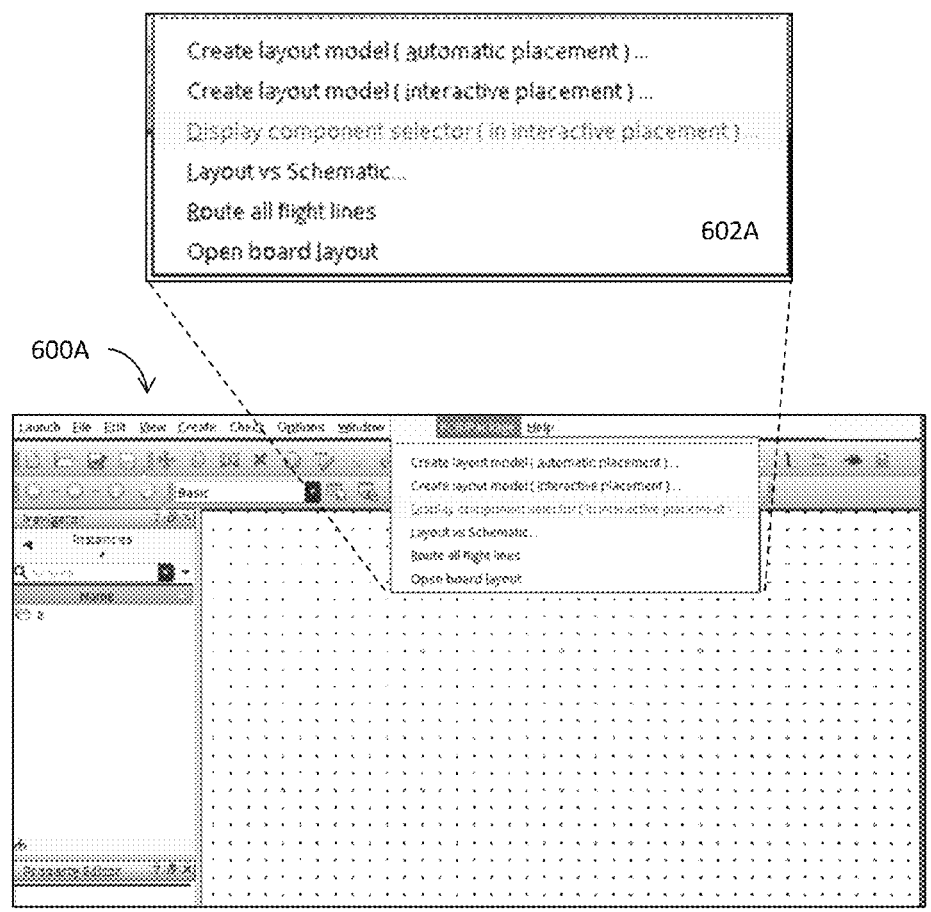
FIGS. 6A-6E illustrate an example of a layout-driven generation of a multi-fabric schematic for an electronic design in one or more embodiments.
Figure 6B:
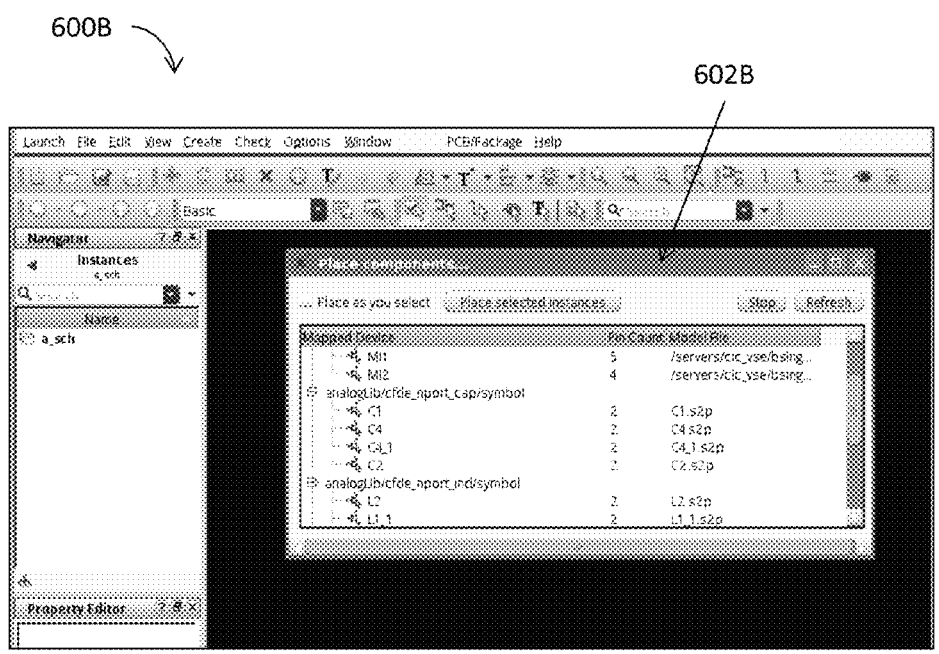
Figure 6C:
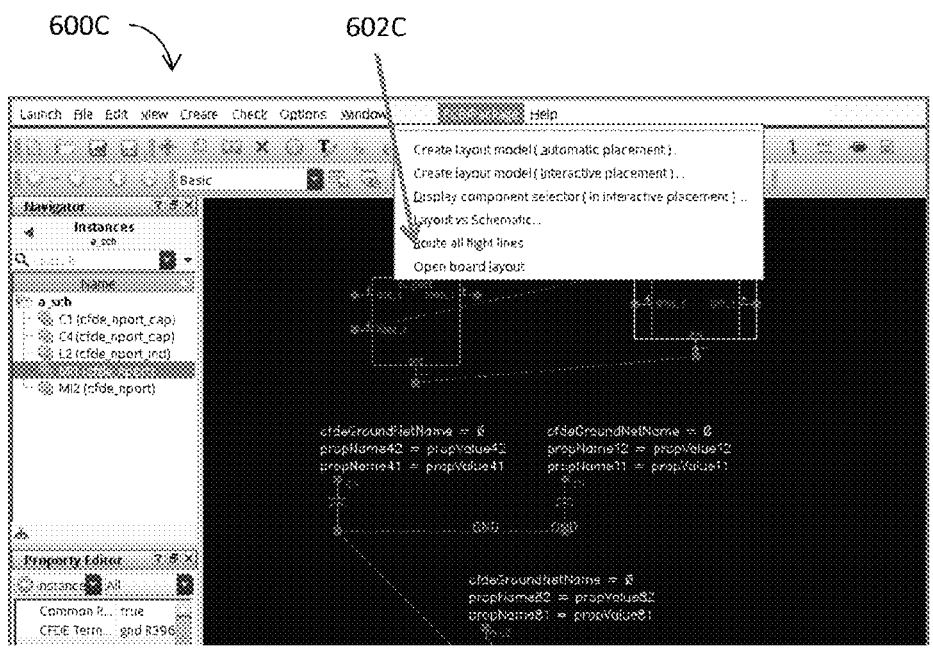
Figure 6D:
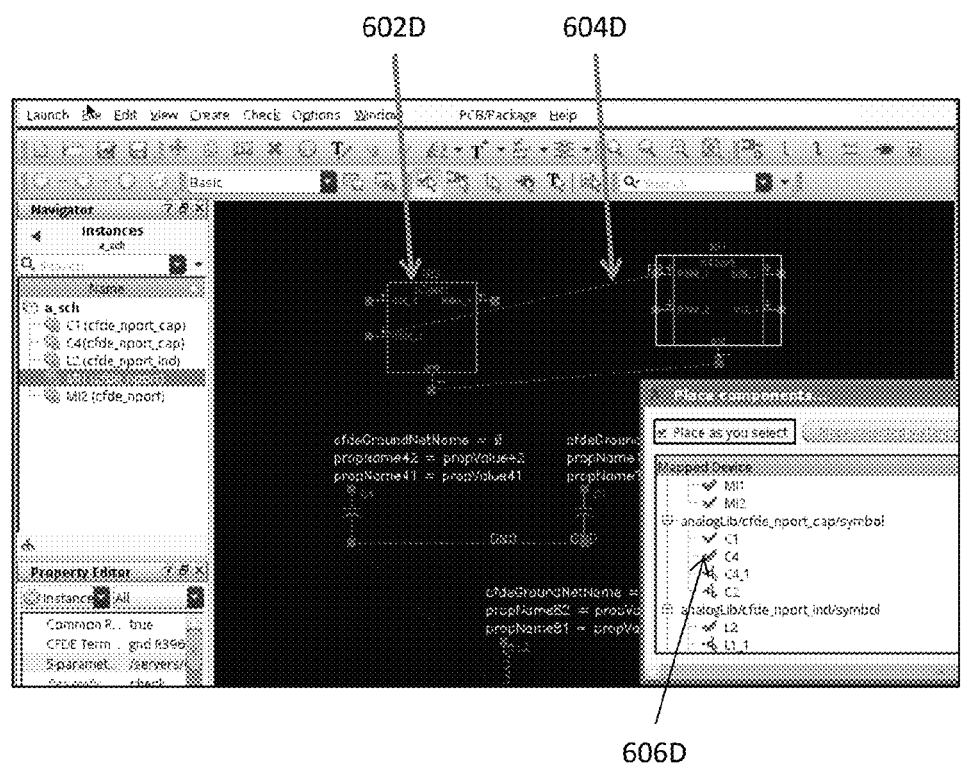
Figure 6E:
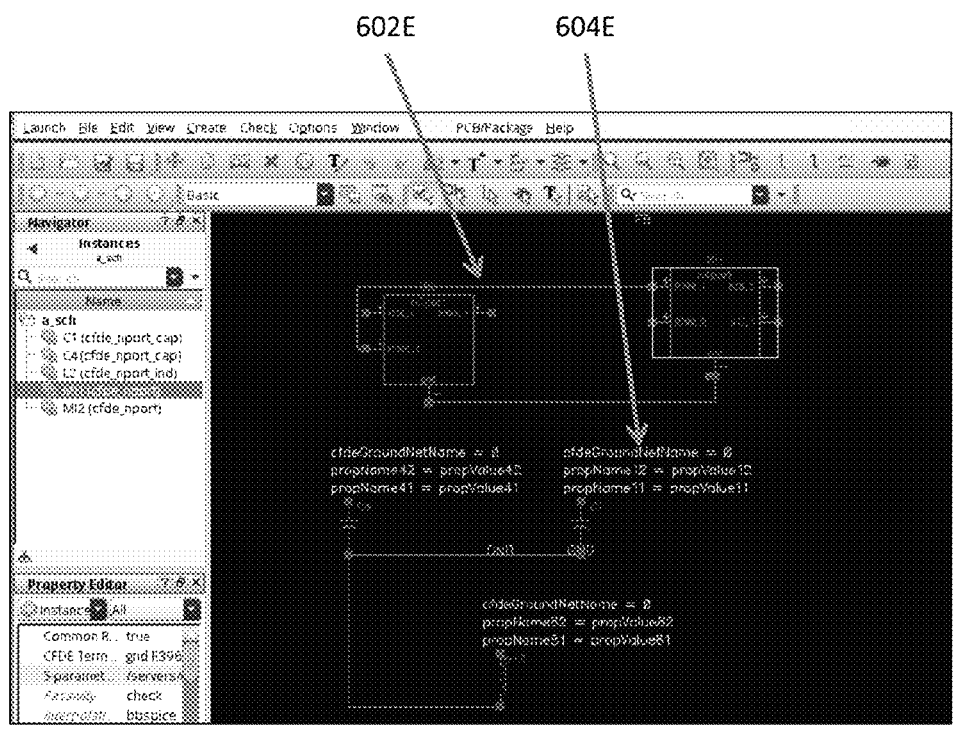

The available mapped parasitic models may be placed or inserted in a multi-fabric schematic as shown in the schematic editor user interface 600C which further provides the commands 602C in FIG. 6C to, for example, interconnect these parasitic models in the multi-fabric schematic. The routed multi-fabric schematic may include, for example, straight flight-line segments 602D and 604D between corresponding ports of connected parasitic models as illustrated in FIG. 6D. The list of devices may also be updated by annotating a placed or routed device with a check mark 606D as shown in FIG. 6D. Alternatively, the multi-fabric schematic design may be routed with orthogonal non-topological routes (e.g., orthogonal flight line segments) 602E; and one or more of the parasitic model instances in the multi-fabric schematic may be annotated or associated with additional information 604E such as the associated property names, corresponding property values, common ground nets, etc. as shown in FIG. 6E.

Figure 6F:
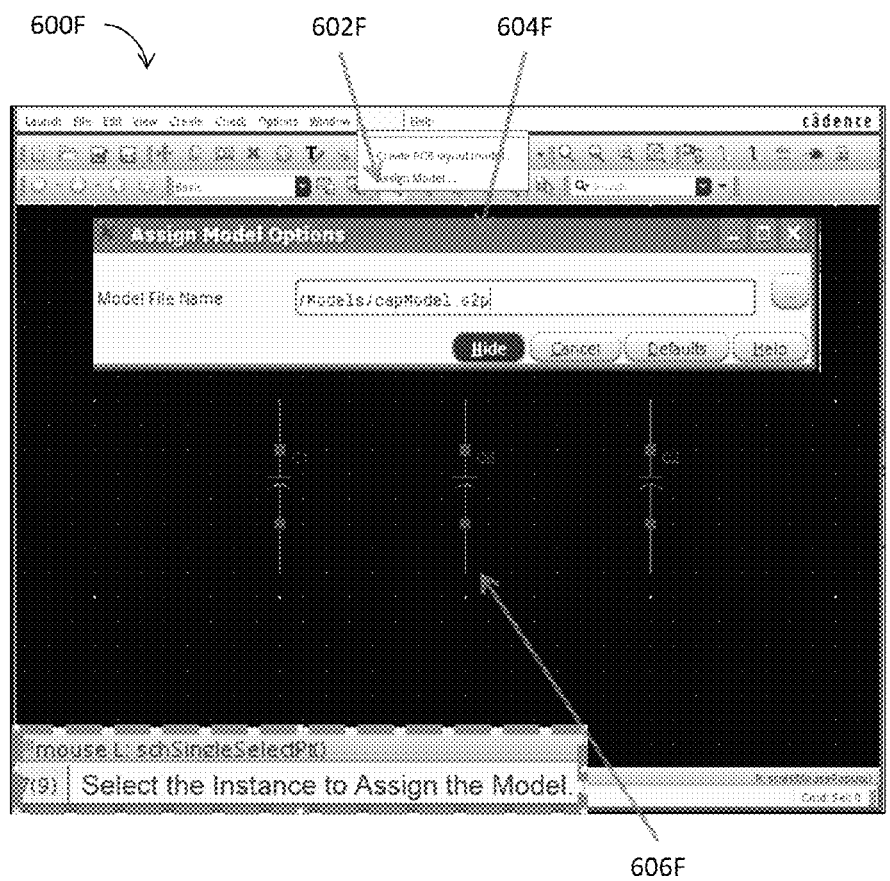
FIGS. 6F-6G illustrate an example of updating the binding between an instance and a parasitic model in one or more embodiments.
Figure 6G:
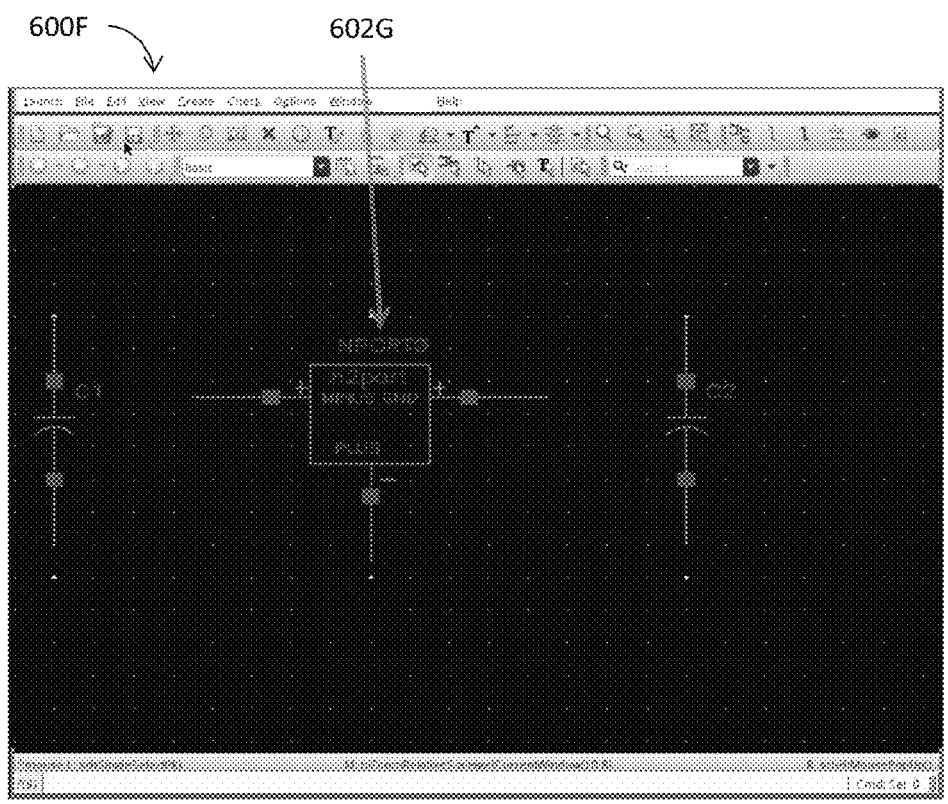

FIGS. 6F-6G illustrate an example of updating the binding between an instance and a parasitic model in one or more embodiments. In this example, a schematic instance 604F in the display area of the schematic editor 600F may be replaced with another parasitic model instance by selecting a command 602F for replacing the schematic instance 604F. A pop-up window 604F may appear for the user to enter the replacement parasitic model that may be used to replace the schematic instance 606F. A user may identify the schematic instance 606F in the display area; and these techniques described herein may automatically replace the schematic instance 606F with the new parasitic model instance 602G as specified in 604F.

Figure 7A:
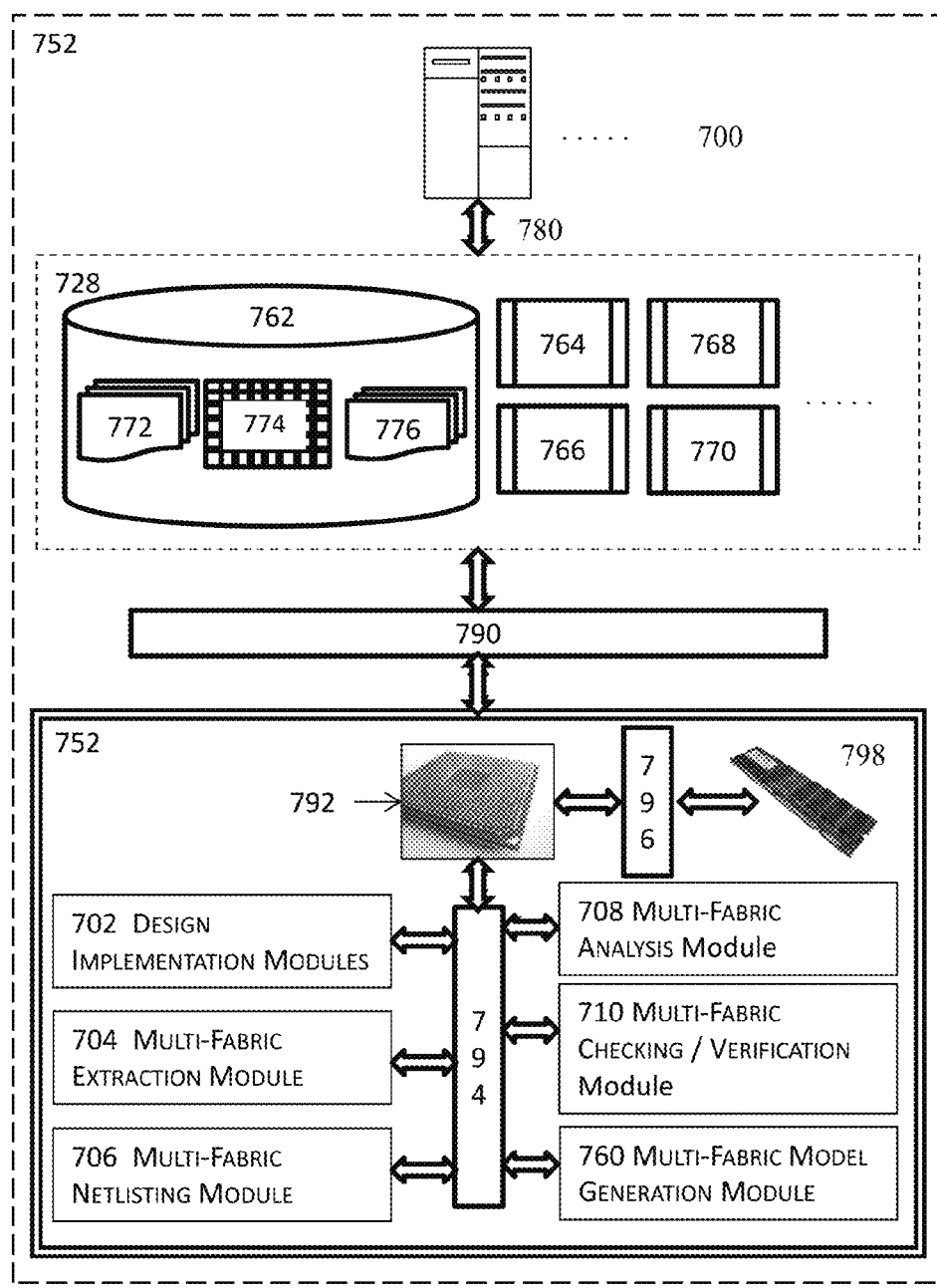
FIG. 7A illustrates a high level schematic block diagrams for implementing a layout-driven, multi-fabric schematic design of an electronic design in one or more embodiments.

FIG. 7A illustrates a high level schematic block diagrams for implementing a layout-driven, multi-fabric schematic design of an electronic design in one or more embodiments. More specifically, FIG. 7A illustrates an illustrative high level schematic block diagrams for constructing a multi-fabric schematic of an electronic design across multiple design fabrics and may comprise one or more computing systems 700, such as a general purpose computer described in the System Architecture Overview section to implement one or more special proposes.

In some embodiments, the one or more computing systems 700 may invoke various system resources such as the processor(s) or processor core(s), memory, disks, etc. The one or more computing systems 700 may also initiate or interact with other computing systems to access, via a computer bus architecture (e.g., a system bus, a control bus, a data bus, or any combinations thereof), various resources 728 that may comprise a floorplanner, a global routing engine, and/or a detail routing engine 764, a layout editor 766, a design rule checker 768, a verification engine 770, etc.

The one or more computing systems 700 may further write to and read from a local or remote non-transitory computer accessible storage 762 that stores thereupon data or information such as, but not limited to, one or more databases (774) such as schematic design database(s) or physical design database(s), electronic circuit design specification database(s), various statistics, various data, rule decks, various design rules, constraints, etc. (772), or other information or data (776) that may be used to facilitate the performance of various functions to achieve the intended purposes.

In some embodiments, the one or more computing systems 700 may include or, either directly or indirectly through the various resources 728, invoke a set of mechanisms 752 including hardware mechanisms and software modules or combinations of one or more hardware mechanisms and one or more software modules that may comprises a plurality of design implementation modules 702 (e.g., schematic design tool, layout tool, etc.) to insert, remove, modify, improve, optimize, or otherwise operate upon designs (e.g., physical designs, schematic designs, etc.) in different fabrics (e.g., the die design fabric, the integrated circuit or IC packaging design fabric, the printed circuit board or PCB design fabric, the test bench design fabric, etc.), one or more multi-fabric extraction modules 704 to extract multiple types of information from one or more electronic designs.

For example, a multi-fabric extraction module 704 may extract s-parameters (scattering parameters delineating the relation between an incident wave and a reflected wave at a port of a device), parasitic information, connectivity information, or any other required or desired types of information from a physical design (e.g., a layout) that spans across multiple design fabrics (e.g., an IC or integrated circuit design fabric, an IC package design fabric, a printed circuit board or PCB design fabric, etc.) that may be used to facilitate the automatic construction of a multi-fabric schematic in a multi-fabric layout driven schematic construction process.

The set of mechanisms 752 may further optionally include one or more multi-fabric netlisting modules 706 to determine the netlist or connectivity information from a multi-fabric electronic design (e.g., a multi-fabric layout) across multiple design fabrics. The connectivity information may include information about how circuit component designs are connected in an electronic design. For example, connectivity information may include the identifications of ports, pins, pads, or terminals (collectively ports for plural or port for singular) of circuit component designs in a layout, and the identifications of nets or net segments interconnecting various ports of the circuit component designs in the layout.

The set of mechanisms 752 may also include one or more multi-fabric analysis modules 708 to analyze multi-fabric designs across multiple design fabrics with one or more analyses or simulations. For example, a multi-fabric analysis module 708 may perform one or more transient simulations on a multi-fabric schematic design that is generated by various techniques that construct the multi-fabric schematic design with corresponding parasitic models. As another example, a multi-fabric analysis module 708 may also perform one or more analyses or simulations in determining one or more characteristics of a parasitic model (e.g., the end frequency or frequency steps of an s-parameter model).

These one or more multi-fabric analysis modules 708 may perform any required or desired analyses to facilitate various intended functions or purposes described herein. The set of modules 752 may also include one or more check or verification modules 710 to check or verify the correctness of, for example, multi-fabric schematic designs, one or more parasitic models determined with various techniques described herein, etc. across multiple design fabrics. In addition or in the alternative, this set of modules 752 may include one or more multi-fabric model generation modules 760 to generate parasitic models (e.g., s-parameter models, SPICE models, etc.) for layout devices or layout circuit component designs.

In some embodiments, the computing system 700 may include the various resources 728 such that these various resources may be invoked from within the computing system via a computer bus 780 (e.g., a data bus interfacing a microprocessor 792 and the non-transitory computer accessible storage medium 798 or a system bus 790 between a microprocessor 792 and one or more engines in the various resources 728). In some other embodiments, some or all of these various resources may be located remotely from the computing system 700 such that the computing system may access the some or all of these resources via a computer bus 780 and one or more network components.

The computing system may also include one or more mechanisms in the set of mechanisms 752. One or more mechanisms in the set 752 may include or at least function in tandem with a microprocessor 792 via a computer bus 794 in some embodiments. In these embodiments, a single microprocessor 792 may be included in and thus shared among more than one mechanism even when the computing system 700 includes only one microprocessor 792. A microprocessor 792 may further access some non-transitory memory 798 (e.g., random access memory or RAM) via a system bus 796 to read and/or write data during the microprocessor's execution of processes.

In various embodiments, a first device may be identified for insertion into the multi-fabric schematic. Depending on the design from which the device is identified, the corresponding parasitic model may be determined anew or identified from a library of existing parasitic models. For example, a parasitic model for a device may be provided by the manufacturer or owner of the device in some embodiments and may thus be identified from a library of existing parasitic models.

For the identified device, the corresponding parasitic model may be identified by referencing the device map, and a parasitic schematic instance may be instantiated in a cross design fabric multi-fabric schematic by automatically generating a boundary for the parasitic schematic instance and further by inserting a number of ports, terminals, or pins with respect to the boundary at the exact, approximate, or random locations with respect to the boundary based on the identified connectivity information. Various properties from the header information of the parasitic model or from the identified connectivity information may be associated with or stitched or annotated to the parasitic schematic instance and/or the pins, terminals, or ports. This parasitic model may then be connected within itself and to one or more other external models or schematic circuit components by using the net information from the connectivity information identified above.

A parasitic model may not be always available for a specific device (e.g., a custom IC design) in some other embodiments. In some of these embodiments, the parasitic model for this specific device may be constructed anew or modified from another parasitic model for another device resembling the specific device. In some other embodiments, the specific device may be modeled and included in the newly created multi-fabric schematic as a conventional schematic instance, rather than a parasitic schematic instance. Whether a device is modeled in the cross fabric schematic design as a parasitic model or a conventional schematic model, the model representing the device may be connected within itself and to one or more other external models or schematic circuit components by using the net information from the connectivity information identified above.

A cross fabric schematic design may thus be constructed by representing circuit component designs as respective parasitic models and conventional schematic models for some circuit component designs for which parasitic models are unavailable and are not to be constructed anew or modified from existing parasitic models. The cross fabric schematic design may be further modified. For example, the parasitic model for a particular device may not be available so the particular device may be modeled as a conventional schematic model in the cross fabric schematic design. The parasitic model for this particular device may subsequently become available. In this example, the conventional schematic model for this particular device may be replaced by the parasitic model by altering the mapping between the conventional schematic model and the particular device to point to the newly determined parasitic model.

Furthermore, the locations and other connectivity information may be preserved in the parasitic model such that the interconnections between the to-be-replaced conventional schematic model and other portions of the cross fabric schematic design are not disturbed. The schematic symbol of the newly determined parasitic model may be used to replace that of the conventional schematic model in the cross fabric schematic design to complete the modification. Other types of modifications may also be done by using similar techniques described herein. An existing parasitic model for a device may also be modified by changing the mapping between the device and the existing parasitic model to another parasitic model.

The device map may also be modified to reflect the changes in the mapping between circuit component designs and their corresponding parasitic models. A device map may be generated from a device map template that includes provisions for identifications of circuit component designs in an electronic design, identifications for corresponding parasitic models, and one or more corresponding property names and their respective property values for each circuit component design in some embodiments. Such device map templates may be arranged and stored in many different formats or techniques. For example, a device map may include a text file, a flat or hierarchical data structure, or a database table in various embodiments.

In some embodiments, various techniques may reference a device map template to automatically populate the list of circuit component designs in a layout and to automatically populate the respective parasitic models, property names, and property values, etc. As the mapping between the circuit component designs and their corresponding parasitic models is modified, the device map may also be updated to reflect the modifications in the binding between the circuit component designs and their parasitic models in some embodiments. In some other embodiments, a different device map or the same device map of a different version may be generated to accommodate the modifications in the mapping between the circuit component designs and their corresponding parasitic models.

In some embodiments, a device map file, the cross fabric schematic design, and/or the layout may be cross checked with one another to verify the correctness of the device map file, the cross fabric schematic design, and/or the layout. In some of these embodiments, these techniques may verify whether the devices listed in the device map are actually in the layout or the schematic design and/or whether the properties indicated by the device map are consistent with properties provided by a layout or a schematic design. In some embodiments, these techniques may verify the newly generated cross fabric schematic design having parasitic models against the corresponding layout via a layout-versus-schematic (LVS) tool and reported the differences between the cross fabric schematic design and the layout.

For example, these techniques may report a verification violation or warning when parasitic model symbol (e.g., an s-parameter model) in the cross fabric schematic design is not listed in the device map; these techniques may report a verification violation or warning when a parasitic model file pointed to by an instance in the cross fabric schematic is inconsistent with that in the corresponding device map; these techniques may report a verification violation or warning when a parasitic model symbol is not found in the corresponding layout; these techniques may report a verification violation or warning when the connectivity of devices in the cross fabric schematic is not identical to that in the layout; or these techniques may report a verification violation or warning when one or more properties of one or more circuit component designs in the cross fabric schematic design differ from those on the corresponding circuit component designs in the device map.

Some embodiments are directed at generation of cross fabric schematic design from a layout of a multi-fabric electronic design by automatic or interactive placement of schematic circuit component designs. In these embodiments, the PCB design, the IC package designs, the IC designs may be identified. Layout traces (e.g., wires) and their corresponding parasitic models (e.g., s-parameter models) may be identified or determined.

The device map for the electronic design may be identified or generated at by identifying a device map template and further by automatic populating circuit component design identifiers (e.g., device names) and their corresponding parasitic model identifiers, one or more property names, one or more property values, etc. into the device map template. Cells, libraries, and views that may be required or desired may also be identified. For example, these techniques may identify the schematic libraries, schematic cells, schematic cell views, etc. in an IC design fabric, an IC package design fabric, a PCB design fabric, etc. for various circuit design components in different design fabrics.

These libraries, cells, and views may be further referenced for the generation of a cross-fabric, simulatable schematic design. With the device map, parasitic models may be identified for at least some of the circuit component designs in the layout. These parasitic models may then be inserted into a cross-fabric, simulatable schematic design via automatic placement where a schematic editor executes various instructions to place these parasitic models in the cross-fabric, simulatable schematic design or via interactive placement where a schematic editor executes various instructions to place these parasitic models in the cross-fabric, simulatable schematic design with at least some user inputs or feedback through a user interface.

These automatically or interactively placed parasitic models may be automatically routed with straight or Manhattan flight-line segments that interconnect various ports, terminals, or pins together as guided by the layout connectivity information based in part or in whole upon the names of these ports, terminals, or pins. Any circuit component designs that do not correspond to any parasitic models may be modeled as conventional schematic instances in some embodiments.

In some of these embodiments, these conventional schematic instances may be further stitched, associated, or annotated with corresponding parasitics that may be precisely or approximately captured from the corresponding layout components although these conventional schematic instances are nevertheless different from the other instances that are represented as, for example, s-parameter models or Spice models. In some other embodiments, parasitic models may be constructed anew for these circuit component designs not corresponding to any existing parasitic models. The generated cross-fabric simulatable schematic may thus be associated or embedded with parasitics, and any schematic simulations performed on such a cross-fabric simulatable schematic may thus provide more accurate results due to accounting the parasitics in the simulations.

System Architecture Overview

Figure 7B:
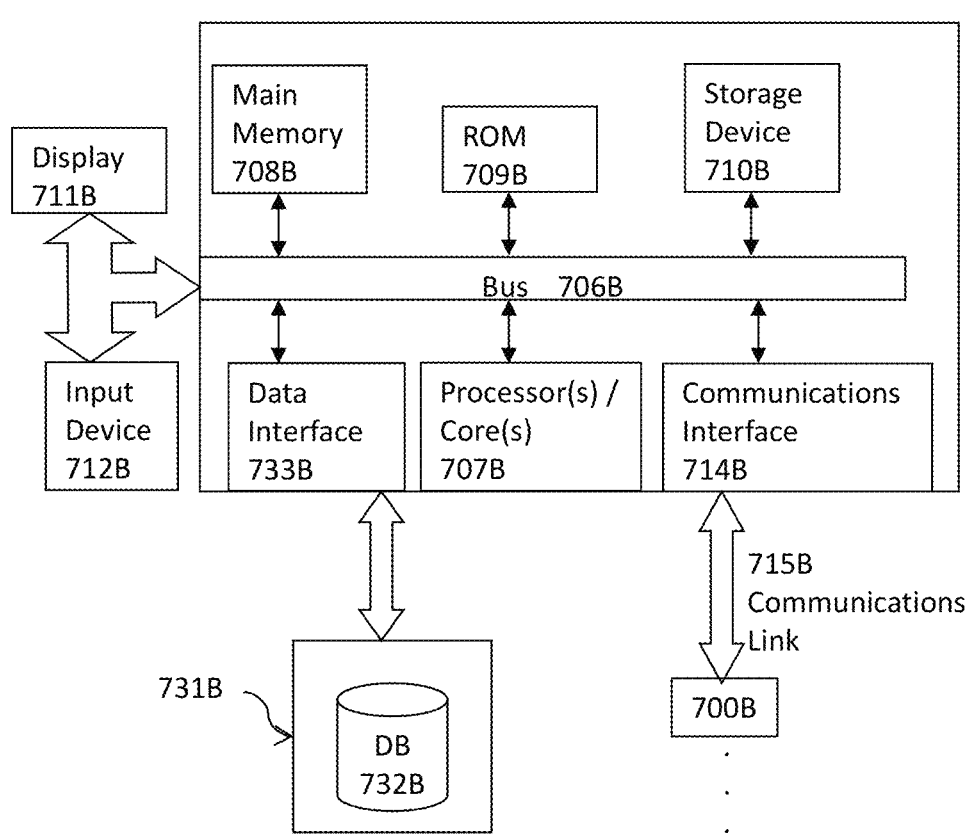
FIG. 7B illustrates a computerized system on which a method for implementing a layout-driven, multi-fabric schematic design of an electronic design may be implemented.

FIG. 7B illustrates a block diagram of an illustrative computing system 700B suitable for constructing a multi-fabric schematic of an electronic design across multiple design fabrics as described in the preceding paragraphs with reference to various figures. Computer system 700B includes a bus 706B or other communication mechanism for communicating information, which interconnects subsystems and devices, such as processor 707B, system memory 708B (e.g., RAM), static storage device 709B (e.g., ROM), disk drive 710B (e.g., magnetic or optical), communication interface 714B (e.g., modem or Ethernet card), display 711B (e.g., CRT or LCD), input device 712B (e.g., keyboard), and cursor control (not shown).

According to one embodiment, computing system 700B performs specific operations by one or more processor or processor cores 707B executing one or more sequences of one or more instructions contained in system memory 708B. Such instructions may be read into system memory 708B from another computer readable/usable storage medium, such as static storage device 709B or disk drive 710B. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 707B, where the one or more processors, one or more processor cores, or combination thereof executes one or more threads. For example, various acts of identifying, various acts of determining, various acts of classifying, various acts of implementing, various acts of performing, various acts of transforming, various acts of decomposing, various acts of updating, various acts of presenting, various acts of modifying, etc. may be performed by one or more processors, one or more processor cores, or combination thereof.

A mechanisms described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a mechanism described herein may be implemented as an application-specific integrated circuit (ASIC) in some embodiments.

In these embodiments, a mechanism may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of mechanism. A mechanism described herein or an equivalent thereof may perform its respective functions alone or in conjunction with one or more other mechanisms. A mechanism described herein or an equivalent thereof may thus invoke one or more other mechanisms by, for example, issuing one or more commands or function calls. The invocation of one or more other mechanisms may be fully automated or may involve one or more user inputs.

The term "computer readable storage medium" or "computer usable storage medium" as used herein refers to any non-transitory medium that participates in providing instructions to processor 707B for execution. Such a medium may take many forms, including but not limited to, non-volatile media and volatile media. Non-volatile media includes, for example, optical or magnetic disks, such as disk drive 710B. Volatile media includes dynamic memory, such as system memory 708B. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 700B. According to other embodiments of the invention, two or more computer systems 700B coupled by communication link 715 (e.g., LAN, PTSN, or wireless network) may perform the sequence of instructions required to practice the invention in coordination with one another.

Computer system 700B may transmit and receive messages, data, and instructions, including program, i.e., application code, through communication link 715B and communication interface 714B. Received program code may be executed by processor 707B as it is received, and/or stored in disk drive 710B, or other non-volatile storage for later execution. In an embodiment, the computing system 700B operates in conjunction with a data storage system 731B, e.g., a data storage system 731B that includes a database 732B that is readily accessible by the computing system 700B. The computing system 700B communicates with the data storage system 731B through a data interface 733B. A data interface 733B, which is coupled with the bus 706B, transmits and receives electrical, electromagnetic or optical signals that include data streams representing various types of signal information, e.g., instructions, messages and data. In embodiments of the invention, the functions of the data interface 733B may be performed by the communication interface 714B.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing a layout-driven, multi-fabric schematic design of an electronic design, the computer implemented method comprising:

identifying, with a multi-fabric implementation module including or coupled with at least one micro-processor of a computing system, a multi-fabric layout spanning across multiple design fabrics and layout connectivity information;

correlating a first set of devices in the multi-fabric layout with respective parasitic models at least by referencing a device map corresponding to the multi-fabric layout; and generating a multi-fabric schematic by using at least the respective parasitic models and the layout connectivity information.

2. The computer implemented method of claim 1, further comprising:

modifying the multi-fabric schematic based in part or in whole upon results of verifications or analyses performed on the multi-fabric schematic.

3. The computer implemented method of claim 1, further comprising:

identifying a first device from the first set of devices in the multi-fabric layout;

determining the layout connectivity information for the first device from the layout connectivity information; and identifying a first parasitic model based in part or in whole upon the device map.

4. The computer implemented method of claim 3, wherein the multiple design fabrics include two of an integrated circuit (IC) design fabric, an IC package design fabric, and a printed circuit board (PCB) design fabric.

5. The computer implemented method of claim 3, further comprising:

an act of parsing the first parasitic model; and retrieving header information from the first parasitic model based in part or in whole upon results of the act of parsing the first parasitic model.

6. The computer implemented method of claim 3, further comprising:

instantiating a first parasitic model instance of the first parasitic model in the multi-fabric schematic; and determining a first number of ports, first port ordering, and first identifications of the first number of ports for the first parasitic model instance of the first parasitic model in the multi-fabric schematic based in part or in whole upon information in the first parasitic model or the layout connectivity information; and incorporating the first number of ports, the first port ordering, and the first identifications of the number of ports into the first parasitic model instance.

7. The computer implemented method of claim 6, further comprising:

identifying a second set of devices that corresponds to no available parasitic models for representing the second set of devices in the multi-fabric schematic; and identifying a second device from the second set of devices.

8. The computer implemented method of claim 7, further comprising:

representing the second device from the second set of devices as a conventional schematic instance; and augmenting the conventional schematic instance with a second number of ports, second port ordering, and second identifications of the second number of ports for the second device.

9. The computer implemented method of claim 7, further comprising:

constructing a second parasitic model for the second device from the second set of devices; and instantiating a second parasitic model instance of the second parasitic model to represent the second device in the multi-fabric schematic, the second parasitic model instance including a second number of ports, second port ordering, and second identifications of the second number of ports for the second device.

10. The computer implemented method of claim 6, further comprising:

determining routing between a plurality of instances in the multi-fabric schematic;

identifying a third schematic instance of a third device from the multi-fabric schematic;

determining a third parasitic model instance for the third device;

replacing the third schematic instance with the third parasitic model instance; and updating the device map to modify binding information for the third device.

11. The computer implemented method of claim 6, further comprising:

implementing one or more modifications to the multi-fabric schematic or multi-fabric layout; and synchronizing the multi-fabric layout, the multi-fabric schematic, and the device map based in part or in whole upon the one or more modifications.

12. The computer implemented method of claim 11, further comprising:

an act of performing one or more verification tasks on the multi-fabric schematic, the one or more verification tasks including a layout-versus-schematic check; and reporting one or more differences identified from the one or more verification tasks based in part or in whole upon results of the act of performing the one or more verification tasks.

13. A system for implementing a layout-driven, multi-fabric schematic design of an electronic design, the system comprising:

a plurality of modules, at least one of which comprises at least one microprocessor including one or more processor cores executing one or more threads in a computing system; and a non-transitory computer accessible storage medium storing thereupon a program code that includes a sequence of instructions that, when executed by the at least one micro-processor or processor core of a computing system, causes the at least one micro-processor or processor core at least to:

identify, with a multi-fabric implementation module including or coupled with at least one micro-processor of a computing system, a multi-fabric layout spanning across multiple design fabrics and layout connectivity information;

correlate a first set of devices in the multi-fabric layout with respective parasitic models at least by referencing a device map corresponding to the multi-fabric layout; and generate a multi-fabric schematic by using at least the respective parasitic models and the layout connectivity information.

14. The system of claim 13, wherein the program code includes the sequence of instructions that, when executed by the at least one micro-processor or processor core, further causes the at least one processor or processor core to:

identify a first device from the first set of devices in the multi-fabric layout;

determine the layout connectivity information for the first device from the layout connectivity information; and identify a first parasitic model based in part or in whole upon the device map.

15. The system of claim 14, wherein the program code includes the sequence of instructions that, when executed by the at least one micro-processor or processor core, further causes the at least one processor or processor core to:

instantiate a first parasitic model instance of the first parasitic model in the multi-fabric schematic; and determine a first number of ports, first port ordering, and first identifications of the first number of ports for the first parasitic model instance of the first parasitic model in the multi-fabric schematic based in part or in whole upon information in the first parasitic model or the layout connectivity information; and incorporate the first number of ports, the first port ordering, and the first identifications of the number of ports into the first parasitic model instance.

16. The system of claim 15, wherein the program code includes the sequence of instructions that, when executed by the at least one micro-processor or processor core, further causes the at least one processor or processor core to:

identify a second set of devices that corresponds to no available parasitic models for representing the second set of devices in the multi-fabric schematic;

identify a second device from the second set of devices;

represent the second device from the second set of devices as a conventional schematic instance; and augment the conventional schematic instance with a second number of ports, second port ordering, and second identifications of the second number of ports for the second device.

17. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing a layout-driven, multi-fabric schematic design of an electronic design, the set of acts comprising:

identifying, with a multi-fabric implementation module including or coupled with at least one micro-processor of a computing system, a multi-fabric layout spanning across multiple design fabrics and layout connectivity information;

correlating a first set of devices in the multi-fabric layout with respective parasitic models at least by referencing a device map corresponding to the multi-fabric layout; and generating a multi-fabric schematic by using at least the respective parasitic models and the layout connectivity information.

18. The article of manufacture of claim 17, the set of acts further comprising:

identifying a first device from the first set of devices in the multi-fabric layout;

determining the layout connectivity information for the first device from the layout connectivity information; and identifying a first parasitic model based in part or in whole upon the device map, wherein the multiple design fabrics include two of an integrated circuit (IC) design fabric, an IC package design fabric, and a printed circuit board (PCB) design fabric.

19. The article of manufacture of claim 18, the set of acts further comprising:

instantiating a first parasitic model instance of the first parasitic model in the multi-fabric schematic; and determining a first number of ports, first port ordering, and first identifications of the first number of ports for the first parasitic model instance of the first parasitic model in the multi-fabric schematic based in part or in whole upon information in the first parasitic model or the layout connectivity information;

incorporating the first number of ports, the first port ordering, and the first identifications of the number of ports into the first parasitic model instance;

identifying a second set of devices that corresponds to no available parasitic models for representing the second set of devices in the multi-fabric schematic; and identifying a second device from the second set of devices.

20. The article of manufacture of claim 19, the set of acts further comprising:

constructing a second parasitic model for the second device from the second set of devices; and instantiating a second parasitic model instance of the second parasitic model to represent the second device in the multi-fabric schematic, the second parasitic model instance including a second number of ports, second port ordering, and second identifications of the second number of ports for the second device.

* * * * *